United States Patent
Steinberg

(10) Patent No.: US 11,113,086 B1
(45) Date of Patent: Sep. 7, 2021

(54) VIRTUAL SYSTEM AND METHOD FOR SECURING EXTERNAL NETWORK CONNECTIVITY

(71) Applicant: FireEye, Inc., Milpitas, CA (US)

(72) Inventor: Udo Steinberg, Braunschweig (DE)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 15/199,873

(22) Filed: Jun. 30, 2016

Related U.S. Application Data

(60) Provisional application No. 62/187,115, filed on Jun. 30, 2015.

(51) Int. Cl.
*G06F 9/455* (2018.01)
*G06F 21/55* (2013.01)
*G06F 11/30* (2006.01)
*G06F 11/34* (2006.01)

(52) U.S. Cl.
CPC ........ *G06F 9/45558* (2013.01); *G06F 11/301* (2013.01); *G06F 11/3495* (2013.01); *G06F 21/554* (2013.01); *G06F 2009/45587* (2013.01); *G06F 2009/45595* (2013.01)

(58) Field of Classification Search
CPC ............. G06F 9/45558; G06F 11/3495; G06F 11/301; G06F 21/554; G06F 2009/45595; G06F 2009/45587
USPC .......................................................... 718/1
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Garfinkel, Tai, and Mendel Rosenblum. "A Virtual Machine Introspection Based Architecture for Intrusion Detection." Ndss. vol. 3. No. 2003. 2003.*

(Continued)

*Primary Examiner* — Lewis A Bullock, Jr.
*Assistant Examiner* — Kevin X Lu
(74) *Attorney, Agent, or Firm* — Rutan & Tucker LLP

(57) ABSTRACT

According to one embodiment, a computing device comprises one or more hardware processor and a memory coupled to the one or more processors. The memory comprises software that supports a virtualization software architecture including a first virtual machine operating under control of a first operating system. Responsive to determining that the first operating system has been compromised, a second operating system, which is stored in the memory in an inactive (dormant) state, is now active and controlling the first virtual machine or a second virtual machine different from the first virtual machine that now provides external network connectivity.

30 Claims, 6 Drawing Sheets

(56) References Cited

U.S. PATENT DOCUMENTS

| | | |
|---|---|---|
| 5,842,002 A | 11/1998 | Schnurer et al. |
| 5,878,560 A | 3/1999 | Johnson |
| 5,960,170 A | 9/1999 | Chen et al. |
| 5,978,917 A | 11/1999 | Chi |
| 5,983,348 A | 11/1999 | Ji |
| 6,013,455 A | 1/2000 | Bandman et al. |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Lychenko et al. |
| 7,028,179 B2 | 4/2006 | Anderson et al. |
| 7,043,757 B2 | 5/2006 | Hoefelmeyer et al. |
| 7,058,791 B1 | 6/2006 | Hughes et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,409,719 B2 | 8/2008 | Armstrong et al. |
| 7,418,729 B2 | 8/2008 | Szor |
| 7,424,745 B2 | 9/2008 | Cheston et al. |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,958,558 B1 | 6/2011 | Leake et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,151,263 B1 | 4/2012 | Venkitachalam et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,169 B2 * | 6/2012 | Venkitachalam ..... G06F 9/45533 714/11 |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,266,395 B2 | 9/2012 | Li |
| 8,271,978 B2 | 9/2012 | Bennett et al. |
| 8,286,251 B2 | 10/2012 | Eker et al. |
| 8,290,912 B1 * | 10/2012 | Searls ................ G06F 11/1453 707/654 |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,347,380 B1 | 1/2013 | Satish et al. |
| 8,353,031 B1 | 1/2013 | Rajan et al. |
| 8,365,286 B2 | 1/2013 | Poston |
| 8,365,297 B1 | 1/2013 | Parshin et al. |

(56) References Cited

U.S. PATENT DOCUMENTS

| | | |
|---|---|---|
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,387,046 B1 | 2/2013 | Montague et al. |
| 8,397,306 B1 | 3/2013 | Tormasov |
| 8,402,529 B1 | 3/2013 | Green et al. |
| 8,418,230 B1 | 4/2013 | Cornelius et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,479,294 B1 | 7/2013 | Li et al. |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,236 B2 | 8/2013 | Zimmer et al. |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,612,659 B1 | 12/2013 | Serebrin et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,756,696 B1 | 6/2014 | Miller |
| 8,775,715 B2 | 7/2014 | Tsirkin et al. |
| 8,776,180 B2 | 7/2014 | Kumar et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,799,997 B2 | 8/2014 | Spiers et al. |
| 8,805,947 B1 | 8/2014 | Kuzkin et al. |
| 8,806,647 B1 | 8/2014 | Daswani et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,060 B1 | 9/2014 | Beloussov et al. |
| 8,850,570 B1 | 9/2014 | Ramzan |
| 8,850,571 B2 | 9/2014 | Staniford et al. |
| 8,863,279 B2 | 10/2014 | McDougal et al. |
| 8,875,295 B2 | 10/2014 | Lutas et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,910,238 B2 | 12/2014 | Lukacs et al. |
| 8,935,779 B2 | 1/2015 | Manni et al. |
| 8,949,257 B2 | 2/2015 | Shifter et al. |
| 8,984,478 B2 | 3/2015 | Epstein |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,125 B2 | 5/2015 | Kumar et al. |
| 9,027,135 B1 | 5/2015 | Aziz |
| 9,071,638 B1 | 6/2015 | Aziz et al. |
| 9,087,199 B2 | 7/2015 | Sallam |
| 9,092,616 B2 | 7/2015 | Kumar et al. |
| 9,092,625 B1 | 7/2015 | Kashyap et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,117,079 B1 | 8/2015 | Huang et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,213,651 B2 | 12/2015 | Malyugin et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,563,488 B2 | 2/2017 | Fadel et al. |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |

(56) References Cited

U.S. PATENT DOCUMENTS

| | | |
|---|---|---|
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,095 B2 | 1/2019 | Ferguson et al. |
| 10,176,321 B2 | 1/2019 | Abbasi et al. |
| 10,181,029 B1 | 1/2019 | Ismael et al. |
| 10,191,858 B2 | 1/2019 | Tsirkin |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,726,127 B1 | 7/2020 | Steinberg |
| 2001/0005889 A1 | 6/2001 | Albrecht |
| 2001/0047326 A1 | 11/2001 | Broadbent et al. |
| 2002/0013802 A1* | 1/2002 | Mori ............... G06F 9/5016 718/1 |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Shame et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0025016 A1 | 2/2004 | Focke et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |

(56) References Cited

U.S. PATENT DOCUMENTS

| | | |
|---|---|---|
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075252 A1 | 4/2006 | Kallahalla et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0112416 A1* | 5/2006 | Ohta .................. H04L 63/102 726/1 |
| 2006/0117385 A1 | 6/2006 | Mester et al. |
| 2006/0123477 A1 | 6/2006 | Raghavan et al. |
| 2006/0130060 A1 | 6/2006 | Anderson et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236127 A1 | 10/2006 | Kurien et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248528 A1 | 11/2006 | Oney et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006226 A1 | 1/2007 | Hendel |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0055837 A1 | 3/2007 | Rajagopal et al. |
| 2007/0064689 A1 | 3/2007 | Shin et al. |
| 2007/0074169 A1 | 3/2007 | Chess et al. |
| 2007/0094676 A1 | 4/2007 | Fresko et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143565 A1 | 6/2007 | Corrigan et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0300227 A1 | 12/2007 | Mall et al. |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0065854 A1 | 3/2008 | Schoenberg et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0123676 A1 | 5/2008 | Cummings et al. |
| 2008/0127348 A1 | 5/2008 | Largman et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0235793 A1 | 9/2008 | Schunter et al. |
| 2008/0244569 A1 | 10/2008 | Challener et al. |
| 2008/0263665 A1 | 10/2008 | Ma et al. |
| 2008/0294808 A1 | 11/2008 | Mahalingam et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089860 A1 | 4/2009 | Forrester et al. |
| 2009/0089879 A1 | 4/2009 | Wang et al. |
| 2009/0094697 A1 | 4/2009 | Provos et al. |
| 2009/0106754 A1 | 4/2009 | Liu et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0158432 A1 | 6/2009 | Zheng et al. |
| 2009/0172661 A1 | 7/2009 | Zimmer et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0204964 A1 | 8/2009 | Foley et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0254990 A1 | 10/2009 | McGee |
| 2009/0265692 A1 | 10/2009 | Godefroid et al. |
| 2009/0271867 A1 | 10/2009 | Zhang |
| 2009/0276771 A1 | 11/2009 | Nickolov et al. |
| 2009/0300415 A1 | 12/2009 | Zhang et al. |
| 2009/0300761 A1 | 12/2009 | Park et al. |
| 2009/0320011 A1 | 12/2009 | Chow et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |

(56) References Cited

U.S. PATENT DOCUMENTS

| | | |
|---|---|---|
| 2010/0031360 A1 | 2/2010 | Seshadri et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0100718 A1 | 4/2010 | Srinivasan |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0191888 A1 | 7/2010 | Serebrin et al. |
| 2010/0192223 A1 | 7/2010 | Ismael et al. |
| 2010/0220863 A1 | 9/2010 | Dupaquis et al. |
| 2010/0235647 A1 | 9/2010 | Buer |
| 2010/0235831 A1 | 9/2010 | Dittmer |
| 2010/0251104 A1 | 9/2010 | Massand |
| 2010/0254622 A1 | 10/2010 | Kamay et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299665 A1 | 11/2010 | Adams |
| 2010/0299754 A1 | 11/2010 | Amit et al. |
| 2010/0306173 A1 | 12/2010 | Frank |
| 2010/0306560 A1 | 12/2010 | Bozek et al. |
| 2011/0004737 A1 | 1/2011 | Greenebaum |
| 2011/0004935 A1 | 1/2011 | Moffie et al. |
| 2011/0022695 A1 | 1/2011 | Dalal et al. |
| 2011/0025504 A1 | 2/2011 | Lyon et al. |
| 2011/0041179 A1 | 2/2011 | St hlberg |
| 2011/0047542 A1 | 2/2011 | Dang et al. |
| 2011/0047544 A1 | 2/2011 | Yehuda et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0060947 A1* | 3/2011 | Song ............... G06F 21/53 714/37 |
| 2011/0078794 A1 | 3/2011 | Manni et al. |
| 2011/0078797 A1* | 3/2011 | Beachem ............ G06F 21/53 726/25 |
| 2011/0082962 A1 | 4/2011 | Horovitz et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0167422 A1 | 7/2011 | Eom et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0296440 A1 | 12/2011 | Launch et al. |
| 2011/0299413 A1 | 12/2011 | Chatwani et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321040 A1 | 12/2011 | Sobel et al. |
| 2011/0321165 A1 | 12/2011 | Capalik et al. |
| 2011/0321166 A1* | 12/2011 | Capalik ............... H04L 63/1416 726/25 |
| 2012/0011508 A1 | 1/2012 | Ahmad |
| 2012/0023593 A1 | 1/2012 | Puder et al. |
| 2012/0047576 A1 | 2/2012 | Do et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0131156 A1 | 5/2012 | Brandt et al. |
| 2012/0144489 A1 | 6/2012 | Jarrett et al. |
| 2012/0159454 A1 | 6/2012 | Barham et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0198514 A1 | 8/2012 | McCune et al. |
| 2012/0210423 A1 | 8/2012 | Friedrichs et al. |
| 2012/0216046 A1 | 8/2012 | McDougal et al. |
| 2012/0216069 A1* | 8/2012 | Bensinger ............ G06F 11/1451 714/3 |
| 2012/0222114 A1 | 8/2012 | Shanbhogue |
| 2012/0222121 A1 | 8/2012 | Staniford et al. |
| 2012/0254993 A1 | 10/2012 | Sallarn |
| 2012/0254995 A1 | 10/2012 | Sallam |
| 2012/0255002 A1 | 10/2012 | Sallam |
| 2012/0255003 A1 | 10/2012 | Sallam |
| 2012/0255012 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260304 A1 | 10/2012 | Morris et al. |
| 2012/0260342 A1 | 10/2012 | Dube et al. |
| 2012/0260345 A1 | 10/2012 | Quinn et al. |
| 2012/0265976 A1 | 10/2012 | Spiers et al. |
| 2012/0266244 A1 | 10/2012 | Green et al. |
| 2012/0278886 A1 | 11/2012 | Luna |
| 2012/0291029 A1 | 11/2012 | Kidambi et al. |
| 2012/0297057 A1 | 11/2012 | Ghosh et al. |
| 2012/0297489 A1 | 11/2012 | Dequevy |
| 2012/0311708 A1 | 12/2012 | Agarwal et al. |
| 2012/0317566 A1 | 12/2012 | Santos et al. |
| 2012/0330801 A1 | 12/2012 | McDougal et al. |
| 2012/0331553 A1 | 12/2012 | Aziz et al. |
| 2013/0007325 A1 | 1/2013 | Sahita et al. |
| 2013/0014259 A1 | 1/2013 | Gribble et al. |
| 2013/0036470 A1 | 2/2013 | Zhu et al. |
| 2013/0036472 A1 | 2/2013 | Aziz |
| 2013/0042153 A1* | 2/2013 | McNeeney ......... G06F 11/1484 714/38.1 |
| 2013/0047257 A1 | 2/2013 | Aziz |
| 2013/0055256 A1 | 2/2013 | Banga et al. |
| 2013/0074185 A1 | 3/2013 | McDougal et al. |
| 2013/0086235 A1* | 4/2013 | Ferris ..................... G06F 9/505 709/223 |
| 2013/0086299 A1 | 4/2013 | Epstein |
| 2013/0086684 A1 | 4/2013 | Mohler |
| 2013/0091571 A1* | 4/2013 | Lu ......................... G06F 21/563 726/23 |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0111593 A1 | 5/2013 | Shankar et al. |
| 2013/0117741 A1 | 5/2013 | Prabhakaran et al. |
| 2013/0117848 A1 | 5/2013 | Golshan et al. |
| 2013/0117849 A1 | 5/2013 | Golshan et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0159662 A1 | 6/2013 | Iyigun et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |

(56) References Cited

U.S. PATENT DOCUMENTS

| | | |
|---|---|---|
| 2013/0160131 A1 | 6/2013 | Madou et al. |
| 2013/0167236 A1 | 6/2013 | Sick |
| 2013/0174214 A1 | 7/2013 | Duncan |
| 2013/0179971 A1 | 7/2013 | Harrison |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0191924 A1 | 7/2013 | Tedesco et al. |
| 2013/0196649 A1 | 8/2013 | Paddon et al. |
| 2013/0227680 A1 | 8/2013 | Pavlyushchik |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282776 A1 | 10/2013 | Durrant et al. |
| 2013/0283370 A1 | 10/2013 | Vipat et al. |
| 2013/0291109 A1 | 10/2013 | Staniford et al. |
| 2013/0298243 A1 | 11/2013 | Kumar et al. |
| 2013/0298244 A1 | 11/2013 | Kumar et al. |
| 2013/0312098 A1 | 11/2013 | Kapoor et al. |
| 2013/0312099 A1 | 11/2013 | Edwards et al. |
| 2013/0318038 A1 | 11/2013 | Shifter et al. |
| 2013/0318073 A1 | 11/2013 | Shifter et al. |
| 2013/0325791 A1 | 12/2013 | Shifter et al. |
| 2013/0325792 A1 | 12/2013 | Shifter et al. |
| 2013/0325871 A1 | 12/2013 | Shifter et al. |
| 2013/0325872 A1 | 12/2013 | Shifter et al. |
| 2013/0326625 A1 | 12/2013 | Anderson et al. |
| 2013/0333033 A1 | 12/2013 | Khesin |
| 2013/0333040 A1 | 12/2013 | Diehl et al. |
| 2013/0347131 A1 | 12/2013 | Mooring et al. |
| 2014/0006734 A1 | 1/2014 | Li et al. |
| 2014/0007097 A1* | 1/2014 | Chin .............. G06F 9/5077 718/1 |
| 2014/0019963 A1 | 1/2014 | Deng et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0075522 A1 | 3/2014 | Paris et al. |
| 2014/0089266 A1* | 3/2014 | Une .............. G06F 11/1469 707/679 |
| 2014/0096134 A1* | 4/2014 | Barak ............ G06F 9/45558 718/1 |
| 2014/0115578 A1 | 4/2014 | Cooper et al. |
| 2014/0115652 A1 | 4/2014 | Kapoor et al. |
| 2014/0130158 A1 | 5/2014 | Wang et al. |
| 2014/0137180 A1 | 5/2014 | Lukacs et al. |
| 2014/0157407 A1 | 6/2014 | Krishnan et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0208123 A1 | 7/2014 | Roth et al. |
| 2014/0230024 A1 | 8/2014 | Uehara et al. |
| 2014/0237600 A1 | 8/2014 | Silberman et al. |
| 2014/0245423 A1 | 8/2014 | Lee |
| 2014/0259169 A1 | 9/2014 | Harrison |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0289105 A1 | 9/2014 | Sirota et al. |
| 2014/0304819 A1 | 10/2014 | Ignatchenko et al. |
| 2014/0310810 A1* | 10/2014 | Brueckner ........ H04L 63/1441 726/23 |
| 2014/0325644 A1 | 10/2014 | Oberg et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1 | 11/2014 | Pratt et al. |
| 2014/0351935 A1 | 11/2014 | Shao et al. |
| 2014/0359239 A1 | 12/2014 | Hiremane et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0013008 A1 | 1/2015 | Lukacs et al. |
| 2015/0095661 A1 | 4/2015 | Sell et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121135 A1 | 4/2015 | Pape |
| 2015/0128266 A1 | 5/2015 | Tosa |
| 2015/0172300 A1 | 6/2015 | Cochenour |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199514 A1 | 7/2015 | Tosa et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0244732 A1 | 8/2015 | Golshan et al. |
| 2015/0304716 A1 | 10/2015 | Sanchez-Leighton |
| 2015/0317495 A1 | 11/2015 | Rodgers et al. |
| 2015/0318986 A1 | 11/2015 | Novak et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0048680 A1 | 2/2016 | Lutas et al. |
| 2016/0057123 A1 | 2/2016 | Jiang et al. |
| 2016/0103698 A1* | 4/2016 | Yang ............... G06F 11/202 714/4.11 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0371105 A1 | 12/2016 | Sieffert et al. |
| 2017/0083703 A1 | 3/2017 | Abbasi et al. |
| 2017/0124326 A1 | 5/2017 | Wailly et al. |
| 2017/0213030 A1 | 7/2017 | Mooring et al. |
| 2017/0344496 A1 | 11/2017 | Chen et al. |
| 2017/0364677 A1* | 12/2017 | Soman .............. G06F 21/53 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2012135192 A2 | 10/2012 |
| WO | 2012154664 A2 | 11/2012 |
| WO | 2012177464 A1 | 12/2012 |
| WO | 2013/067505 A1 | 5/2013 |
| WO | 2013091221 A1 | 6/2013 |
| WO | 2014004747 A2 | 1/2014 |

OTHER PUBLICATIONS

U.S. Appl. No. 15/199,876, filed Jun. 30, 2016 Non-Final Office Action dated Jan. 10, 2018.

U.S. Appl. No. 15/199,871, filed Jun. 30, 2016 Advisory Action dated Nov. 8, 2018.

U.S. Appl. No. 15/199,871, filed Jun. 30, 2016 Notice of Allowance dated Mar. 20, 2019.

U.S. Appl. No. 15/199,876, filed Jun. 30, 2016 Non-Final Office Action dated Mar. 28, 2019.

Venezia, Paul , "NetDetector Captures Intrusions", InfoWorld Issue 27, ("Venezia"), (Jul. 14, 2003).

(56) References Cited

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

U.S. Appl. No. 15/197,634, filed Jun. 29, 2016 Notice of Allowance dated Apr. 18, 2018.

U.S. Appl. No. 15/199,871, filed Jun. 30, 2016 Final Office Action dated Aug. 16, 2018.

U.S. Appl. No. 15/199,871, filed Jun. 30, 2016 Non-Final Office Action dated Apr. 9, 2018.

U.S. Appl. No. 15/199,876, filed Jun. 30, 2016 Final Office Action dated Jul. 5, 2018.

U.S. Appl. No. 15/199,882, filed Jun. 30, 2016 Advisory Action dated Nov. 8, 2018.

U.S. Appl. No. 15/199,882, filed Jun. 30, 2016 Final Office Action dated Aug. 31, 2018.

U.S. Appl. No. 15/199,882, filed Jun. 30, 2016 Non-Final Office Action dated Apr. 5, 2018.

U.S. Appl. No. 15/199,882, filed Jun. 30, 2016 Non-Final Office Action dated Dec. 20, 2018.

U.S. Appl. No. 15/199,871, filed Jun. 30, 2016.

U.S. Appl. No. 15/199,873 filed Jun. 30, 2016.

U.S. Appl. No. 15/199,876 filed Jun. 30, 2016.

U.S. Appl. No. 15/199,882 filed Jun. 30, 2016.

"Mining Specification of Malicious Behavior"—Jha et al, UCSB, Sep. 2007 https://www.cs.ucsb.edu/.about_chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&amumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase © CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware letection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C. , et al., "Honeycomb-Creating Intrusion Detection Signatures Using Honeypots", 2nd Workshop on Hot Topics in Networks (HotNets-11), Boston, USA, (2003).

(56) References Cited

OTHER PUBLICATIONS

Kristoff, J. , "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: a Statistical Viewpoint", ("Marchette"), (2001).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium Useni Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., &Hype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 15/199,876, filed Jun. 30, 2016 Notice of Allowance dated Sep. 9, 2019.

U.S. Appl. No. 15/199,879, filed Jun. 30, 2016 Non-Final Office Action dated Apr. 27, 2018.

U.S. Appl. No. 15/199,879, filed Jun. 30, 2016 Notice of Allowance dated Oct. 4, 2018.

U.S. Appl. No. 15/199,882, filed Jun. 30, 2016 Advisory Action dated Sep. 30, 2019.

U.S. Appl. No. 15/199,882 filed Jun. 30, 2016 Final Office Action dated Jun. 11, 2019.

U.S. Appl. No. 15/199,882, filed Jun. 30, 2016 Non-Final Office Action dated Nov. 1, 2019.

U.S. Appl. No. 15/199,882, filed Jun. 30, 2016 Notice of Allowance dated Mar. 19, 2020.

* cited by examiner

VIRTUAL SYSTEM AND METHOD FOR SECURING EXTERNAL NETWORK CONNECTIVITY

CROSS REFERENCE TO RELATED APPLICATIONS

This application is based upon and claims the benefit of priority from U.S. Provisional Patent Application No. 62/187,115 filed Jun. 30, 2015, the entire contents of which are incorporated herein by reference.

FIELD

Embodiments of the disclosure relate to the field of malware detection. More specifically, one embodiment of the disclosure relates to a hypervisor-based, malware detection architecture.

GENERAL BACKGROUND

In general, virtualization is a technique for hosting different guest operating systems concurrently on the same computing platform. With the emergence of hardware support for full virtualization in an increased number of hardware processor architectures, new virtualization software architectures have emerged. One such virtualization architecture involves adding a software abstraction layer, sometimes referred to as a virtualization layer, between the physical hardware and a virtual machine (referred to as "VM").

A VM is a software abstraction that operates like a physical (real) computing device having a particular operating system. A VM typically features pass-through physical and/or emulated virtual system hardware, and guest system software. The virtual system hardware is implemented by software components in the host (e.g., virtual central processing unit "vCPU" or virtual network interface card "vNIC") that are configured to operate in a similar manner as corresponding physical components (e.g., physical CPU or NIC). The guest system software comprises a "guest" OS and one or more "guest" applications. Controlling execution and allocation of virtual resources, the guest OS may include an independent instance of an operating system such as WINDOWS® OS, MAC® OS, LINUX® OS or the like. The guest application(s) may include any desired software application type such as a Portable Document Format (PDF) reader (e.g., ACROBAT®), a web browser (e.g., EXPLORER®), a word processing application (e.g., WORD®), or the like.

When we run the virtualization layer on an endpoint device, the guest OS is in control of the pass-through endpoint device hardware, notably the network interface card (NIC). A successful (malicious) attack on the guest OS may allow the attacker to control the guest OS and disable external network connectivity via the guest OS. For instance, if the guest OS crashes based on this attack, the virtualization layer of the endpoint device would have neither an ability to communicate with other external devices nor an ability to provide an alert message to advise an administrator of the occurrence of the malicious attack.

A mechanism is needed to ensure external network connectivity and communications even if the guest OS is compromised or no longer functioning correctly.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1A:
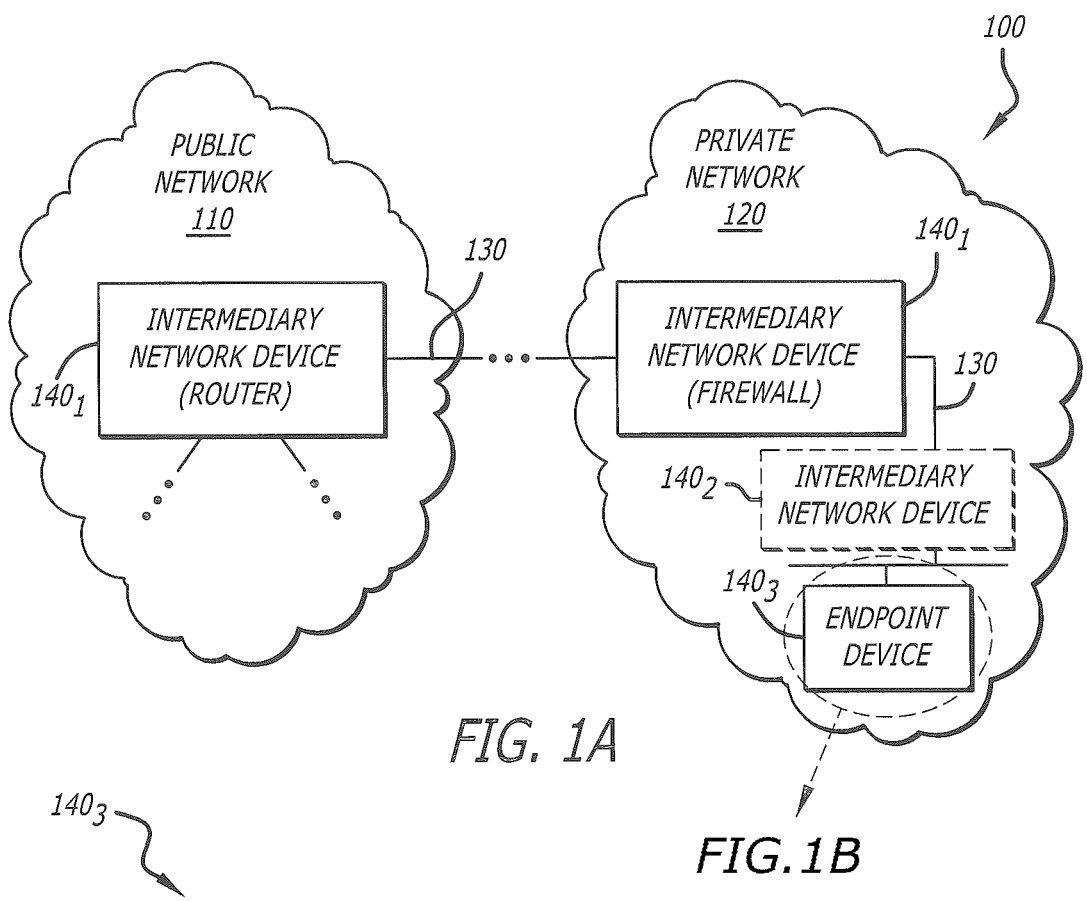
FIG. 1A and FIG. 1B are an exemplary block diagram of a system network that may be utilized by a computing device configured to support virtualization with enhanced security.

Various embodiments of the disclosure are directed to added functionality of the virtualization layer to transition from a first virtual machine with a first (guest) operating system to a second virtual machine with a second (recovery) operating system (OS) in response to the virtualization layer determining that the guest OS is "compromised," namely the guest OS is not functioning properly due to malicious operations conducted by malware. More specifically, the virtualization layer is configured to determine that the guest OS is "compromised" upon detecting (i) an attempt to disable or actual loss of external network connectivity or (ii) the guest OS is no longer working (non-functional). For example, where the guest OS kernel is responsible for the attempt to disable or loss of external network connectivity (and network connectivity cannot be restored after repeated retries), the virtualization layer considers that the guest OS kernel is compromised as being hijacked or infected with malware. As another example, where the guest OS kernel is non-functional, which may be due to a number of factors including malware crashing the kernel, the virtualization layer considers that the guest OS is compromised. As yet another example, where a guest OS application is no longer working (or working properly), especially if that application is crucial to network connectivity (e.g., a network daemon) or issuing alerts (e.g., an agent), the virtualization layer considers that the guest OS is compromised.

Upon determining that the guest OS is compromised, the first virtual machine is stopped by halting operations of one or more virtual processors (vCPUs) within the first virtual machine. As an optional operation, the state of the first virtual machine (e.g., a snapshot of stored content) may be captured by the virtualization layer. Also, normally retained in a dormant state as an OS image within a memory (e.g., a particular non-transitory storage medium such as main memory or on disk), the recovery OS may be accessed once a decision is made to bootstrap the recovery OS.

According to one embodiment of the disclosure, a second virtual machine may be created by bootstrapping a second OS, namely the recovery OS, which includes the recovery OS kernel and one or more guest OS applications. Thereafter, the recovery OS is now assigned network device resources that were previously assigned to the guest OS. The recovery OS may be a different type of OS than the guest OS. For instance, the guest OS may be a WINDOWS® OS while the recovery OS may be a Linux® OS with a minimal memory, either stored on disk or in memory.

According to one embodiment of the disclosure, after the network device resources have been reassigned to the recovery OS, which is responsive to the virtualization layer detecting that the guest OS is compromised, the second virtual machine undergoes a boot process. The purpose of transitioning from the first virtual machine to the second virtual machine is to provide a clean, uninfected and trustworthy platform environment, given that the second virtual machine was dormant (e.g., pre-boot state and not running) when the malicious attack occurred. After completion of the boot process, the second virtual machine is capable of driving a physical pass-through network adapter (e.g., physical NIC or software-emulated NIC) to establish a network connection to another computing device for reporting one or more detected malicious events that occurred while the first virtual machine was executing. This reporting may include the transmission of an alert in a message format (e.g., a Short Message Service "SMS" message, Extended Message Service "EMS" message, Multimedia Messaging Service "MMS", Email, etc.) or any other prescribed wired or wireless transmission format. As part of this reporting, a partial state or an entire state of the compromised, guest OS (or a portion thereof) may be stored and subsequently provided for offline forensic analysis.

Alternatively, in lieu of deploying another virtual machine, the recovery OS and its corresponding guest OS application(s) may be installed into the first virtual machine along with removal of the guest OS (guest OS kernel and its corresponding guest OS applications). Although the first virtual machine is reused, for discussion herein, the reconfigured first virtual machine is referred to as a "second" virtual machine. However, in accordance with this embodiment, the state of the first virtual machine prior to installation of the recovery OS should be captured as described above. Otherwise, any previous state of the guest OS would be lost upon installation of the recovery OS.

Herein, the virtualization layer is a logical representation of at least a portion of a host environment of the virtualization for the computing device. The host environment features a light-weight hypervisor (sometimes referred herein as a "micro-hypervisor") operating at a high privilege level (e.g., ring "0"). In general, the micro-hypervisor operates similar to a host kernel, where the micro-hypervisor at least partially controls the behavior of a virtual machine (VM). Examples of different types of VM behaviors may include the allocation of resources for the VM, scheduling for the VM, which events cause VM exits, or the like. The host environment further features a plurality of software components, generally operating as user-level virtual machine monitors (VMMs), which provide host functionality and operate at a lower privilege level (e.g. privilege ring "3") than the micro-hypervisor.

In summary, a first virtual machine under control of a guest OS is in operation while an OS image of a recovery OS is dormant and resides in a particular location of a non-transitory storage medium. In response to a decision by the virtualization layer to bootstrap the recovery OS, normally upon the occurrence of a prescribed event (e.g., loss of network connectivity caused by a compromised or malfunctioning of the guest OS kernel) as described, a second virtual machine is created under control of the recovery OS. Alternatively, in response to a decision by the virtualization layer to substitute the guest OS within the first virtual machine for the recovery OS, the reconfigured virtual machine, also referred to as the "second virtual machine" is created under control of the recovery OS. However, the state of the first virtual machine, notably the guest OS, should be captured prior to substitution of the recovery OS to avoid loss of the state of the guest OS at the time it was compromised.

1. Terminology

In the following description, certain terminology is used to describe features of the invention. For example, in certain situations, the terms "component" and "logic" are representative of hardware, firmware, software or a running process that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

A component (or logic) may be software in the form of one or more software modules, such as executable code in the form of an executable application, an API, a subroutine, a function, a procedure, an applet, a servlet, a routine, source code, object code, a shared library/dynamic load library, or one or more instructions. Each or any of these software components may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "object" generally refers to a collection of data, whether in transit (e.g., over a network) or at rest (e.g., stored), often having a logical structure or organization that enables it to be classified for purposes of analysis for malware. During analysis, for example, the object may exhibit certain expected characteristics (e.g., expected internal content such as bit patterns, data structures, etc.) and, during processing, a set of expected behaviors. The object may also exhibit unexpected characteristics and a set of unexpected behaviors that may offer evidence of the presence of malware and potentially allow the object to be classified as part of a malicious attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect.

As a self-contained element, the object may be an executable (e.g., an application, program, segment of code, dynamically link library "DLL", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "event" should be generally construed as an activity that is conducted by a software component running on the computing device. The event may occur that causes an undesired action to occur, such as overwriting a buffer, disabling a certain protective feature in the guest environment, or a guest OS anomaly such as the guest OS kernel trying to execute from a user page. Generically, an object or event may be referred to as "data under analysis".

The term "computing device" should be construed as electronics with data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

The term "malware" may be broadly construed as information, in the form of software, data, or one or more commands, that are intended to cause an undesired behavior upon execution, where the behavior is deemed to be "undesired" based on customer-specific rules, manufacturer-based rules, and any other type of rules formulated by public opinion or a particular governmental or commercial entity. This undesired behavior may include a communication-based anomaly or an execution-based anomaly that would (1) alter the functionality of an electronic device executing an application software in a malicious manner; (2) alter the functionality of an electronic device executing that application software without any malicious intent; and/or (3) provide an unwanted functionality which is generally acceptable in other context.

The term "interconnect" may be construed as a physical or logical communication path between two or more computing platforms. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software and/or firmware. Also, the term "agent" should be interpreted as a software component that instantiates a process running in a virtual machine. The agent may be instrumented into part of an operating system (e.g., guest OS) or part of an application (e.g., guest software application). The agent is configured to provide metadata to a portion of the virtualization layer, namely software that virtualizes certain functionality supported by the computing device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Referring to FIG. 1A, an exemplary block diagram of a system network 100 that may be utilized by a computing device configured to support virtualization with enhanced security is described herein. The system network 100 may be organized as a plurality of networks, such as a public network 110 and/or a private network 120 (e.g., an organization or enterprise network). According to this embodiment of system network 100, the public network 110 and the private network 120 are communicatively coupled via network interconnects 130 and intermediary computing devices $140_1$, such as network switches, routers and/or one or more malware detection system (MDS) appliances (e.g., intermediary computing device $140_2$) as described in co-pending U.S. patent application entitled "Microvisor-Based Malware Detection Appliance Architecture" (U.S. patent application Ser. No. 14/962,497), the entire contents of which are incorporated herein by reference. The network interconnects 130 and intermediary computing devices $140_1$, inter alia, provide connectivity between the private network 120 and a computing device $140_3$, which may be operating as an endpoint device for example.

The computing devices $140_i$ (i=1, 2, 3) illustratively communicate by exchanging messages (e.g., packets or other data in a prescribed format) according to a predefined set of protocols, such as the Transmission Control Protocol/Internet Protocol (TCP/IP). However, it should be noted that other protocols, such as the HyperText Transfer Protocol Secure (HTTPS) for example, may be advantageously used with the inventive aspects described herein. In the case of private network 120, the intermediary computing device $140_1$ may include a firewall or other computing device configured to limit or block certain network traffic in an attempt to protect the endpoint devices $140_3$ from unauthorized users.

Figure 1B:
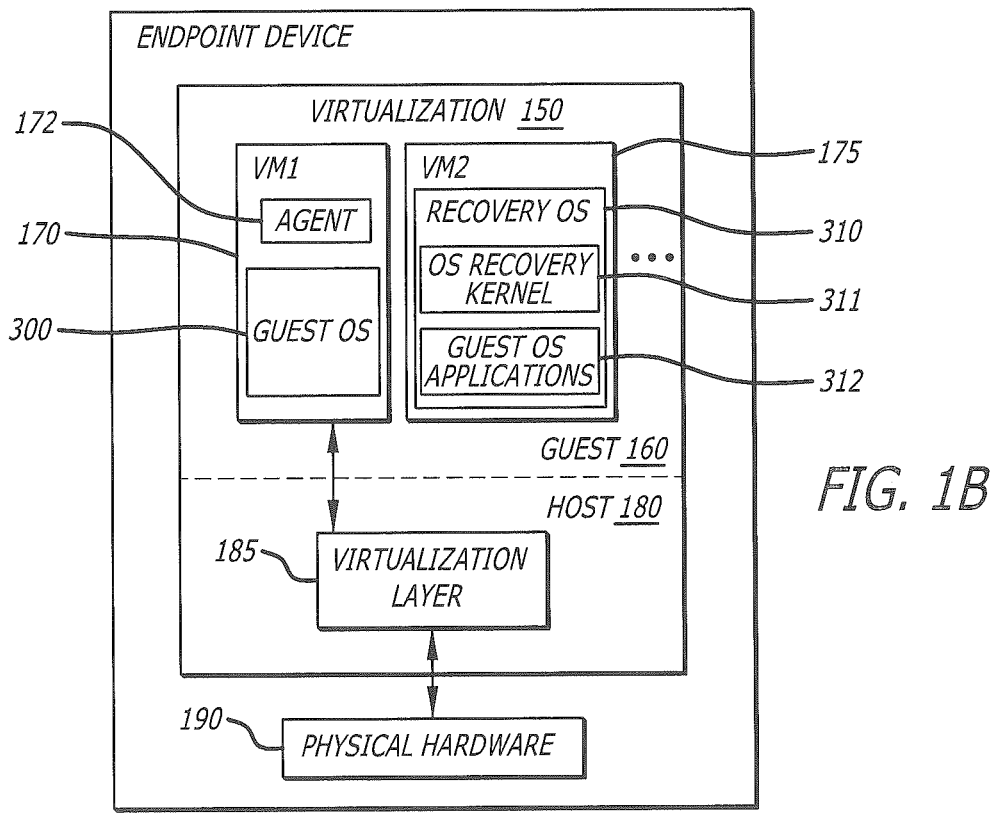

As illustrated in FIG. 1B in greater detail, the endpoint device $140_3$ supports a virtualization software architecture 150 that comprises a guest environment 160 and a host environment 180. As shown, the guest environment 160 comprises one or more virtual machines. As shown, a first virtual machine (VM1) 170 comprises a guest operating system (OS) 300, which includes a guest OS kernel. Residing within the first virtual machine 170 (e.g., within the guest OS 300 or another software component within the first virtual machine 170 or the guest environment 160), a certain component, which are sometimes referred to as a "guest agent" 172, may be configured to monitor and store metadata (e.g., state information, memory accesses, process names, etc.) and subsequently provide the metadata to a virtualization layer 185 within the host environment 180.

A second virtual machine (VM2) 175 comprises a recovery OS 310, which includes a recovery OS kernel 311 and one or more guest OS applications 312 (e.g., applications to configure or bring up the network interface such as a DHCP client, applications for copying files from one machine to another, etc.). The second virtual machine 175 resides in a dormant (non-boot) state until its boot process is initiated by the virtualization layer 185. Although the virtualization layer provides memory isolation between software components, in order to further mitigate a spread of infection of malware already infecting a network device, it is contemplated that the recovery OS 310 may be deployed with an OS type different than the OS type of the guest OS 300. In particular, if the guest OS 300 has been compromised due to an exploitable software vulnerability, it is not desired to provide the recovery OS 310 with the same vulnerability. For example, where the guest OS 300 within the first virtual machine 170 is a WINDOWS® operating system or an IOS® operating system, the recovery OS 310 within the second virtual machine 175 (as shown) may be configured as a version of the LINUX® operating system or the ANDROID® operating system for example. It is contemplated that the second virtual machine 175 may be shown as a logical representation, where the second virtual machine 175 is in fact the first virtual machine 170, where the guest OS 300 (guest OS kernel and corresponding guest applications—not shown) are replaced by the recovery OS 310.

The virtualization layer 185 features (i) a micro-hypervisor 360 (shown in FIG. 3) with access to physical hardware 190 and (ii) one or more host applications running in the user space (not shown). Both the micro-hypervisor and the host applications operate in concert to provide additional functionality by controlling configuration of the second virtual machine 175, including activation or deactivation of the first virtual machine 170 in response to detection of events associated with anomalous behaviors indicating the guest OS 300 has been compromised. This additional functionality ensures external network connectivity is available to the endpoint device 140₃, even when the guest OS 300 is non-functional, potentially hijacked by malware.

Figure 2:
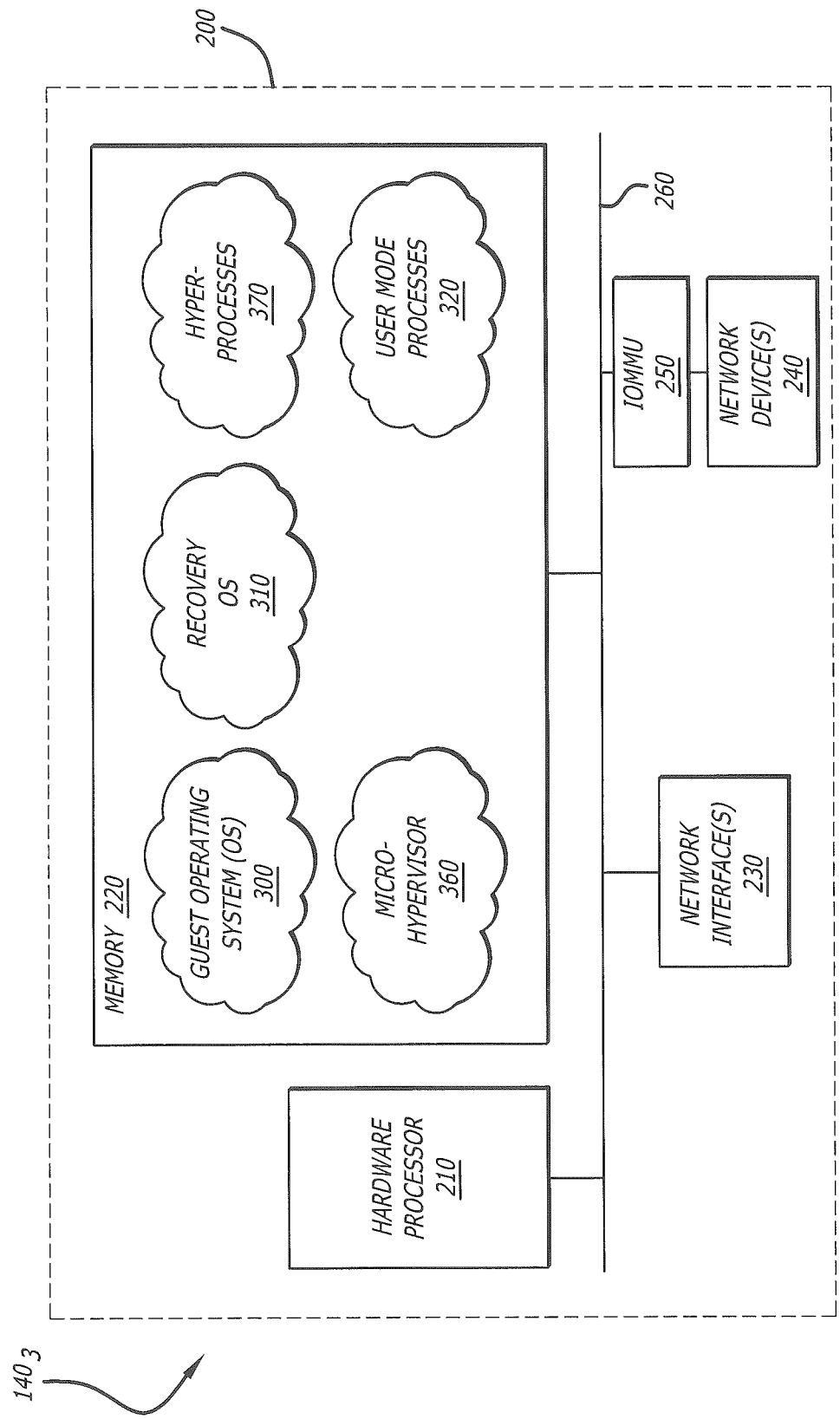
FIG. 2 is an exemplary block diagram of a logical representation of the endpoint device of FIG. 1.

Referring now to FIG. 2, an exemplary block diagram of a representation of the endpoint device 140₃ is shown. Herein, the endpoint device 140₃ illustratively includes at least one hardware processor 210, a memory 220, one or more network interfaces (referred to as "network interface(s)") 230, one or more network devices (referred to as "network device(s)") 240 communicatively coupled by a system interconnect 260, such as a bus. These components are at least partially encased in a housing 200, which is made entirely or partially of a rigid material (e.g., hardened plastic, metal, glass, composite, or any combination thereof) that protects these components from atmospheric conditions.

It is contemplated that some or all of the network device(s) 240 may be coupled to the system interconnect 260 via an Input/Output Memory Management Unit (IOMMU) 250. The IOMMU 250 provides direct memory access (DMA) management capabilities for direct access of data within the memory 220. According to one embodiment of the disclosure, in response to signaling from a component within the virtualization layer 185 (e.g., micro-hypervisor 360 or one of the hyper-processes 370), the IOMMU 250 may be configured to assign (or re-assign) network devices to a particular OS. For instance, when re-configured by the virtualization layer 185, the IOMMU 250 may re-assign some or all of the network device(s) 240 from the guest OS 300 to the recovery OS 310 and one of the hyper-processes 370, namely the guest monitor component 376, may reassign all PCI device (e.g., memory-mapped input/output "MMIO" or I/O) resources of a network adapter from one virtual machine to another, as described below.

The hardware processor 210 is a multipurpose, programmable device that accepts digital data as input, processes the input data according to instructions stored in its memory, and provides results as output. One example of the hardware processor 210 may include an Intel® x86 central processing unit (CPU) with an instruction set architecture. Alternatively, the hardware processor 210 may include another type of CPU, a digital signal processor (DSP), an ASIC, or the like.

The network device(s) 240 may include various input/output (I/O) or peripheral devices, such as a storage device for example. One type of storage device may include a solid state drive (SSD) embodied as a flash storage device or other non-volatile, solid-state electronic device (e.g., drives based on storage class memory components). Another type of storage device may include a hard disk drive (HDD).

Each network interface 230 may include one or more network ports containing the mechanical, electrical and/or signaling circuitry needed to connect the endpoint device 140₃ to the network 120 of FIG. 1 to thereby facilitate communications over the system network 110. To that end, the network interface(s) 230 may be configured to transmit and/or receive messages using a variety of communication protocols including, inter alia, TCP/IP and HTTPS.

The memory 220 may include a plurality of locations that are addressable by the hardware processor 210 and the network interface(s) 230 for storing software (including software applications) and data structures associated with such software. The hardware processor 210 is adapted to manipulate the stored data structures as well as execute the stored software, which includes the guest OS 300, the recovery OS 310, user mode processes 320, a micro-hypervisor 360 and hyper-processes 370.

Herein, the hyper-processes 370 may include instances of software program code (e.g., user-space applications operating as user-level VMMs) that are isolated from each other and run on separate address spaces. In communication with the micro-hypervisor 360, the hyper-processes 370 are responsible for controlling operability of the endpoint device 140₃, including policy and resource allocation decisions, maintaining logs of monitored events for subsequent analysis, managing virtual machine (VM) execution, and managing malware detection and classification.

The micro-hypervisor 360 is disposed or layered beneath both the guest OS kernel 301 and/or the recovery OS kernel 311 of the endpoint device 140₃ and is the only component that runs in the most privileged processor mode (host mode, ring-0). As part of a trusted computing base of most components in the computing platform, the micro-hypervisor 360 is configured as a light-weight hypervisor (e.g., less than 10K lines of code), thereby avoiding inclusion of potentially exploitable virtualization code in an operating system (e.g. x86 virtualization code).

The micro-hypervisor 360 generally operates as the host kernel that is devoid of policy enforcement; rather, the micro-hypervisor 360 provides a plurality of mechanisms that may be used by the hyper-processes 370 for controlling operability of the virtualization. These mechanisms may be configured to control communications between separate protection domains (e.g., between two different hyper-processes 370), coordinate thread processing within the hyper-processes 370 and virtual CPU (vCPU) processing within the VM1 170 or VM2 175, delegate and/or revoke hardware resources, and control interrupt delivery and DMA, as described below.

The guest OS 300, portions of which are resident in memory 220 and executed by the hardware processor 210, functionally organizes the endpoint device 140₃ by, inter alia, invoking operations that support guest applications executing on the endpoint device 140₃. An exemplary guest OS 300 may include a version of the WINDOWS® operating systems, a version of a MAC OS® and IOS® series of operating systems, a version of the LINUX® operating system or a version of the ANDROID® operating system, among others.

The recovery OS 310, portions of which are resident in memory 220 and executed by the hardware processor 210, functionally organizes the endpoint device $140_3$ by, inter alia, invoking operations to at least drive one or more network adapters that provide external network connectivity by establishing one or more external communication channels with one or more other computing devices. Examples of a network adapter may include, but are not limited or restricted to physical or software-emulated data transfer devices such as a network interface card (NIC), a modem, a wireless chipset that supports radio (e.g., radio frequency "RF" signals such as IEEE 802.11 based communications) or supports cellular transmissions, or light emitting device that produces light pulses for communications. It is contemplated that credentials for wireless network access may either be pre-configured in the recovery OS 310, or the guest agent 172 in the guest OS 300 (which is virtualization aware) can send those credentials via the virtualization layer to the recovery OS 310. For wireless network connectivity, the credentials may include Service Set Identifier (SSID), one or more pre-shared keys, or the like.

Herein, in order to avoid malware from a compromised guest OS 300 of the first virtual machine 170 from potentially infecting the recovery OS 310 within the second virtual machine 175, the recovery OS 310 may feature an operating system type different from the guest OS 300 to not suffer the same vulnerabilities that could be exploited. Also, as configured, the recovery OS 310 of the second virtual machine 175 may be configured to support lesser functionality than the guest OS 300, such as the recovery OS 310 may be configured to only drive a small subset (e.g., less than ten) of the network devices than the number of network devices supported by guest OS 300. Although the second virtual machine 175 is shown, for illustrative purposes, as being separate from the first virtual machine 170, it is contemplated that the second virtual machine 175 may be a different virtual machine or a reconfiguration of the first virtual machine 170 with the recovery OS 310 in lieu of the guest OS 300. For the later, the first virtual machine 170 is reused by deleting the compromised OS and substituting for the recovery OS 310

Running on top of the guest OS kernel 301, some of the user mode processes 320 constitute instances of guest OS applications 302 and/or guest applications 322 running in their separate address space. As an example, one of the guest application processes 322 running on top of the guest OS kernel 301 may include ADOBE® READER® from Adobe Systems Inc. of San Jose, Calif. or MICROSOFT® WORD® from Microsoft Corporation of Redmond, Wash. Events (monitored behaviors) of an object that is processed by one of the user mode processes 320 are monitored by a guest agent process 172, which provides metadata to at least one of the hyper-processes 370 and the micro-hypervisor 360 for use in malware detection. Hence, as shown, the object and associated events may be analyzed for the presence of malware; however, it is contemplated that the analytical functionality provided by the different malware detection processes could be provided by different malware detection modules/drivers (not shown) in the guest OS kernel 301. For such deployment, a guest OS anomaly may be detected.

III. Virtualization Software Architecture

Figure 3:
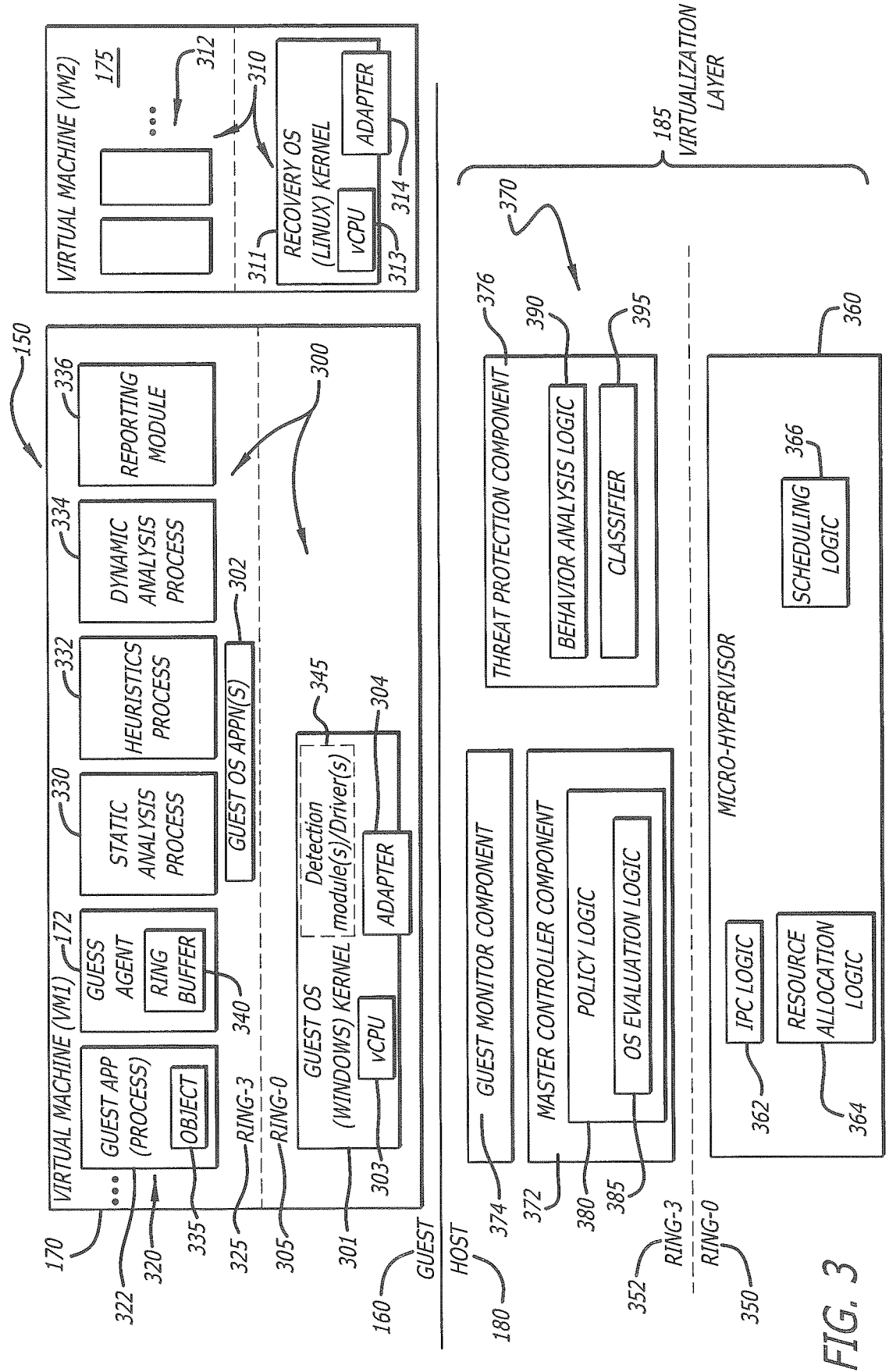
FIG. 3 is an exemplary embodiment of the virtualization of the endpoint device of FIG. 2 with compromised guest OS detection and OS recovery.

Referring now to FIG. 3, an exemplary embodiment of the virtualization software architecture 150 of the endpoint device $140_3$ with compromised guest OS detection and OS recovery is shown. The virtualization software architecture 150 comprises guest environment 160 and host environment 180, both of which may be configured in accordance with a protection ring architecture as shown. While the protection ring architecture is shown for illustrative purposes, it is contemplated that other architectures that establish hierarchical privilege levels for virtualization software components may be utilized.

A. Guest Environment

As shown, the guest environment 160 comprises the first virtual machine 170, which is adapted to analyze an object 335 and/or events produced during execution of the first virtual machine 170 (hereinafter generally referred to as "data for analysis") for the presence of malware. As shown, the first virtual machine 170 features a guest OS 300 that features a guest OS kernel 301 that is running in the most privileged level (Ring-0 305) along with one or more processes 320, which may include one or more instances of guest OS applications 302 and/or one or more instances of software applications 322 (hereinafter "guest application process(es)"). Running in a lesser privileged level (Ring-3 325), the guest application process(es) 322 may be based on the same software application, different versions of the same software application, or even different software applications, provided the guest software process(es) 322 may be controlled by the same guest OS kernel 301 (e.g., WINDOWS® OS kernel).

It is contemplated that malware detection on the endpoint device $140_3$ may be conducted by one or more processes embodied as software components (e.g., guest OS application(s)) running with the first virtual machine 170. These processes include a static analysis process 330, a heuristics process 332 and a dynamic analysis process 334, which collectively operate to detect suspicious and/or malicious behaviors by the object 335 that occur during execution within the first virtual machine 170. Notably, the endpoint device $140_3$ may perform (implement) malware detection as background processing (i.e., minor use of endpoint resources) with data processing being implemented as its primary processing (e.g., in the foreground having majority use of endpoint resources).

As used herein, the object 335 may include, for example, a web page, email, email attachment, file or universal resource locator. Static analysis may conduct a brief examination of characteristics (internal content) of the object 335 to determine whether it is suspicious, while dynamic analysis may analyze behaviors associated with events that occur during virtual execution of the object 335, especially characteristics involving a network adapter such as a physical pass-through network interface card (NIC) (hereinafter "network adapter") 304. For instance, a loss of network connectivity can be determined in a number of ways. For instance, the guest agent 172 may initiate keepalive network packets and the failure to receive responses to these packets may denote loss of network connectivity. Additionally or in the alternative, the virtualization layer detects that the network adapter is not working based on a lack of network interrupts, or statistical registers in the network adapter that identify the number of bytes sent/received is below a prescribed threshold.

According to one embodiment of the disclosure, the static analysis process 330 and the heuristics process 332 may conduct a first examination of the object 335 to determine whether any characteristics of the object are suspicious and/or malicious. A finding of "suspicious" denotes that the characteristics signify a first probability range of the analyzed object 335 being malicious while a finding of "malicious" denotes that the characteristics signify a higher, second probability of the analyzed object 335 being malicious.

The static analysis process 330 and the heuristics process 332 may employ statistical analysis techniques, including the use of vulnerability/exploit signatures and heuristics, to perform non-behavioral analysis in order to detect anomalous characteristics (i.e., suspiciousness and/or maliciousness) without execution (i.e., monitoring run-time behavior) of the object 335. For example, the static analysis process 330 may employ signatures (referred to as vulnerability or exploit "indicators") to match content (e.g., bit patterns) of the object 335 with patterns of the indicators in order to gather information that may be indicative of suspiciousness and/or malware. The heuristics module 332 may apply rules and/or policies to detect anomalous characteristics of the object 335 in order to identify whether the object 335 is suspect and deserving of further analysis or whether it is non-suspect (i.e., benign) and not in need of further analysis. These statistical analysis techniques may produce static analysis results (e.g., identification of communication protocol anomalies and/or suspect source addresses of known malicious servers) that may be provided to a reporting module 336.

More specifically, the static analysis process 330 may be configured to compare a bit pattern of the object 335 content with a "blacklist" of suspicious exploit indicator patterns. For example, a simple indicator check (e.g., hash) against the hashes of the blacklist (i.e., exploit indicators of objects deemed suspicious) may reveal a match, where a score may be subsequently generated (based on the content) by the threat protection component 376 to identify that the object may include malware. In addition to or in the alternative of a blacklist of suspicious objects, bit patterns of the object 335 may be compared with a "whitelist" of permitted bit patterns.

The dynamic analysis process 334 may conduct an analysis of the object 335 during its processing, where the guest agent process 172 monitors the run-time behaviors of the object 335 and captures certain type of events that occur during run time. The events are stored within a ring buffer 340 of the guest agent 172 for possible subsequent analysis by the threat protection component 376, as described below. In an embodiment, the dynamic analysis process 334 normally operates concurrently (e.g., at least partially at the same time) with the static analysis process 330 and/or the heuristics process 332. During processing of the object 335, particular events may be hooked to trigger signaling (and the transfer of data) to the host environment 180 for further analysis by the threat protection component 376 and/or master controller component 372.

For instance, the dynamic analysis process 334 may examine whether any behaviors associated with a detected event that occur during processing of the analyzed object 335 are suspicious and/or malicious. One of these detected events may pertain to activities with the network adapter 304 or any activities that are directed to altering a current operating state of the network adapter 304. A finding of "suspicious" denotes that the behaviors signify a first probability range of the analyzed object 335 being associated with malware while a finding of "malicious" denotes that the behaviors signify a higher second probability of the analyzed object 335 being associated with malware. The dynamic analysis results (and/or events caused by the processing of the object 335 and/or object itself) may also be provided to reporting module 336.

Based on the static analysis results and/or the dynamic analysis results, the reporting module 336 may be configured to generate a report (result data in a particular format) or an alert (message advising of the detection suspicious or malicious events) for transmission via network adapter 314 to a remotely located computing device, such as MDS $140_2$ or another type of computing device.

In addition or in lieu of analysis of the object 335, it is contemplated that the presence of a guest OS anomaly, which may be detected by malware detection processes 302 or malware detection modules/drivers 345 in the guest OS kernel 301, may be detected and reported to the host environment 180 (e.g., guest monitor component 374 and/or threat protection component 376) and/or reporting module 336).

1. Guest OS

In general, the guest OS 300 manages certain operability of the first virtual machine 170, where some of these operations are directed to the execution and allocation of virtual resources involving network connectivity, memory translation, or driving of one or more network devices including a network adapter. More specifically, the guest OS 300 may receive an input/output (I/O) request from the object 335 being processed by one or more guest software process(es) 322, and in some cases, translates the I/O request into instructions. These instructions may be used, at least in part, by virtual system hardware (e.g., vCPU 303), to drive the network adapter 304 for establishing network communications with other network devices. Upon establishing connectivity with the private network 120 and/or the public network 110 of FIG. 1 and in response to detection that the object 335 is malicious, the endpoint device $140_3$ may initiate an alert messages via reporting module 336 and the network adapter 304. Alternatively, with network connectivity, the guest OS 300 may receive software updates from administrators via the private network 120 of FIG. 1 or from a third party provider via the public network 110 of FIG. 1.

2. Guest Agent

According to one embodiment of the disclosure, the guest agent 172 is a software component configured to provide the virtualization layer 185 with metadata that may assist in the handling of malware detection. Instrumented into either a guest software application 320 (as shown), a portion of the guest OS 300 or operating as a separate module, the guest agent 172 is configured to provide metadata to the virtualization layer 185 in response to at least one selected event.

Herein, the guest agent 172 comprises one or more ring buffers 340 (e.g., queue, FIFO, shared memory, and/or registers), which records certain events that may be considered of interest for malware detection. Examples of these events may include information associated with a newly created process (e.g., process identifier, time of creation, originating source for creation of the new process, etc.), information associated with an access to certain restricted port or memory address, or the like. The recovery of the information associated with the stored events may occur through a "pull" or "push" recovery scheme, where the guest agent 172 may be configured to download the metadata periodically or aperiodically (e.g., when the ring buffer 340 exceeds a certain storage level or in response to a request). The request may originate from the threat protection component 376 and is generated by the guest monitor component 374.

3. Recovery OS

When dormant, the recovery OS 310 is stored as an OS image, the recovery OS 310 manages operability of the second virtual machine 175, most notably its network connectivity. More specifically, the second virtual machine 175 with the recovery OS 310 transitions from its normal dormant (inactive) state into an active state in response to the virtualization layer 185 determining that the guest OS 300 of the first virtual machine 170 has been compromised. Prior to, contemporaneously with, or after activation of the second virtual machine 175, the first virtual machine 170 transitions from an active state to an inactive state when the second virtual machine 175 is deployed as a separate virtual machine. When the recovery OS 310 is substituted for the guest OS 300 within the first virtual machine 170, the second virtual machine 175 is effectively the reconfigured first virtual machine 170.

The above-described transitions are conducted to provide the endpoint device $140_3$ with external network connectivity that includes one or more external communication channels (via the network adapter 314) to a remotely located (external) computing device. The external communication channel allows for transmission of an alert message from the reporting module 336 to an external computing device to denote the detection of a malicious attack. Alternatively, with network connectivity, the recovery OS 310 may receive software updates (e.g., patches, an updated version, etc.) from an administrator via the private network 120 of FIG. 1 or from a third party provider via the public network 110 of FIG. 1. The recovery OS 310 may be used for all forms of investigative analysis of the guest OS 300 as well as for remediation of any issues related to the (compromised) guest OS 300. As an example, the network connectivity of the recovery OS 310 may be used by a remote party to perform over-the-network forensic analysis of a host that has been reported as compromised or malfunctioning or to send off the state/image of the compromised VM 170 across the network for remote analysis.

B. Host Environment

As further shown in FIG. 3, the host environment 180 features a protection ring architecture that is arranged with a privilege hierarchy from the most privileged level 350 (Ring-0) to a lesser privilege level 352 (Ring-3). Positioned at the most privileged level 350 (Ring-0), the micro-hypervisor 360 is configured to directly interact with the physical hardware, such as hardware processor 210 or memory 220 of FIG. 2.

Running on top of the micro-hypervisor 360 in Ring-3 352, a plurality of processes being instances of host applications (referred to as "hyper-processes" 370) communicate with the micro-hypervisor 360. Some of these hyper-processes 370 may include master controller component 372, guest monitor component 374 and threat protection component 376. Each of these hyper-processes 372, 374 and 376 represents a separate software instance with different functionality and is running in a separate address space. As these hyper-processes 370 are isolated from each other (i.e. not in the same binary), inter-process communications between the hyper-processes 370 are handled by the micro-hypervisor 360, but regulated through policy protection by the master controller component 372.

1. Micro-Hypervisor

The micro-hypervisor 360 may be configured as a lightweight hypervisor (e.g., less than 10K lines of code) that operates as a "host" OS kernel. The micro-hypervisor 360 features logic (mechanisms) for controlling operability of the computing device, such as endpoint device $140_3$ as shown. The mechanisms include inter-process communication (IPC) logic 362, resource allocation logic 364 and scheduling logic 366, where all of these mechanisms are based, at least in part, on a plurality of kernel features—protection domains, execution contexts, scheduling contexts, portals, and semaphores (hereinafter collectively as "kernel features 368") as partially described in a co-pending U.S. patent application entitled "Microvisor-Based Malware Detection Endpoint Architecture" (U.S. patent application Ser. No. 14/929,821), the entire contents of which are incorporated herein by reference.

More specifically, a first kernel feature is referred to as "protection domains," which correspond to containers where certain resources for the hyper-processes 370 can be assigned, such as various data structures (e.g., execution contexts, scheduling contexts, etc.). Given that each hyper-process 370 corresponds to a different protection domain, a first hyper-process (e.g., master controller component 372) is spatially isolated from a second (different) hyper-process (e.g., guest monitor component 374). Furthermore, the first hyper-process would be spatially isolated (within the address space) from the first and second virtual machines 170 and 175 as well.

A second kernel feature is referred to as an "execution context," which features thread level activities within one of the hyper-processes (e.g., master controller component 372). These activities may include, inter alia, (i) contents of hardware registers, (ii) pointers/values on a stack, (iii) a program counter, and/or (iv) allocation of memory via, e.g., memory pages. The execution context is thus a static view of the state of a thread of execution.

Accordingly, the thread executes within a protection domain associated with that hyper-process of which the thread is a part. For the thread to execute on a hardware processor 210, its execution context may be tightly linked to a scheduling context (third kernel feature), which may be configured to provide information for scheduling the execution context for execution on the hardware processor 210. Illustratively, the scheduling context may include a priority and a quantum time for execution of its linked execution context on the hardware processor 210.

Hence, besides the spatial isolation provided by protection domains, the micro-hypervisor 360 enforces temporal separation through the scheduling context, which is used for scheduling the processing of the execution context as described above. Such scheduling by the micro-hypervisor 360 may involve defining which hardware processor may process the execution context (in a multi-processor environment), what priority is assigned the execution priority, and the duration of such execution.

Communications between protection domains are governed by portals, which represent a fourth kernel feature that is relied upon for generation of the IPC logic 362. Each portal represents a dedicated entry point into a corresponding protection domain. As a result, if one protection domain creates the portal, another protection domain may be configured to call the portal and establish a cross-domain communication channel.

Lastly, of the kernel features, semaphores facilitate synchronization between execution context on the same or on different hardware processors. The micro-hypervisor 360 uses the semaphores to signal the occurrence of hardware interrupts to the user applications.

The micro-hypervisor 360 utilizes one or more of these kernel features to formulate mechanisms for controlling operability of the endpoint device 200. One of these mechanisms is the IPC logic 362, which supports communications between separate protection domains (e.g., between two different hyper-processes 370). Thus, under the control of the IPC logic 362, in order for a first software component to communicate with another software component, the first software component needs to route a message to the micro-hypervisor 360. In response, the micro-hypervisor 360 switches from a first protection domain (e.g., first hyper-process 372) to a second protection domain (e.g., second hyper-process 374) and copies the message from an address space associated with the first hyper-process 372 to a different address space associated with the second hyper-process 374.

Another mechanism provided by the micro-hypervisor 360 is resource allocation logic 364. The resource allocation logic 364 enables a first software component to share one or more memory pages with a second software component under the control of the micro-hypervisor 360. Being aware of the location of one or more memory pages, the micro-hypervisor 360 provides the protection domain associated with the second software component access to the memory location(s) associated with the one or more memory pages.

Also, the micro-hypervisor 360 contains scheduling logic 366 that, when invoked, selects the highest-priority scheduling context and dispatches the execution context associated with the scheduling context. As a result, the scheduling logic 366 ensures that, at some point in time, all of the software components can run on the hardware processor 210 as defined by the scheduling context. Also, the scheduling logic 366 re-enforces that no component can monopolize the hardware processor 210 longer than defined by the scheduling context.

2. Master Controller

Referring still to FIG. 3, generally operating as a root task, the master controller component 372 is responsible for enforcing policy rules directed to operations of the virtualization software architecture 150. This responsibility is in contrast to the micro-hypervisor 360, which provides mechanisms for inter-process communications and resource allocation, but does not dictate how and when such functions occur.

Herein, the master controller component 372 may be configured with a policy engine 380 to conduct a number of policy decisions, including some or all of the following: (1) memory allocation (e.g., distinct physical address space assigned to different software components); (2) execution time allotment (e.g., scheduling and duration of execution time allotted on a selected process basis); (3) virtual machine creation (e.g., number of VMs, OS type, etc.); (4) inter-process communications (e.g., which processes are permitted to communicate with which processes, etc.); and/or (5) network device reallocation to the second virtual machine 175 with the recovery OS 310 in response to detecting that the current guest OS 300 has been compromised.

Additionally, the master controller component 372 is responsible for the allocation of resources. Initially, the master controller component 372 receives access to most of the physical resources, except for access to security critical resources that should be driven by high privileged (Ring-0) components, not user space (Ring-3) software components such as hyper-processes 370. For instance, while precluded from access to the memory management unit (MNU) or the interrupt controller, the master controller component 372 may be configured with OS evaluation logic 385, which is adapted to control the selection of which software components are responsible for driving which network devices. For instance, the master controller component 372 may reconfigure the IOMMU 250 of FIG. 2 so that (i) the vCPU 303 of the first virtual machine 170 is halted, (ii) some or all of the network devices 240 that were communicatively coupled to (and driven by) the guest OS kernel 301 are now under control of the recovery OS kernel 310, including a network adapter 314 that is part of the recovery OS 310, and (iii) the vCPU 313 of the second virtual machine 175 is activated from a previously dormant state, where the operability of the second virtual machine 175 is controlled by the recovery OS 310.

The master controller component 372 is platform agnostic. Thus, the master controller component 372 may be configured to enumerate what hardware is available to a particular process (or software component) and to configure the state of the hardware (e.g., activate, place into sleep state, etc.).

By separating the master controller component 372 from the micro-hypervisor 360, a number of benefits are achieved. One inherent benefit is increased security. When the functionality is placed into a single binary, which is running in host mode, any vulnerability may place the entire computing device at risk. In contrast, each of the software components within the host mode is running in its own separate address space.

3. Guest Monitor

Referring still to FIG. 3, the guest monitor component 374 is an instance of a user space application that is responsible for managing the execution of the first virtual machine 170 and/or the second virtual machine 175. Such management includes operating in concert with the threat protection component 376 to determine whether or not certain events, detected by the guest monitor component 374 during processing of the object 335 within the VM 170, are malicious.

In response to receiving one or more events from the guest agent 172 that are directed to the network adapter 304, the guest monitor component 374 determines whether any events are directed to disabling or disrupting operations of the network adapter 304. Data associated with the events is forwarded to the threat protection component 376. Based on this data, the threat protection component 376 may determine if the events denote that the guest OS 300 is compromised and the events further suggest that malware is within the guest OS 300 and is attempting to disrupt or has disabled external network communications for the endpoint device $140_3$.

Although the IOMMU 250 of FIG. 2 may be responsible for reassigning control of network devices among different OS, notably control of the network adapter, according to one embodiment of the disclosure, it is contemplated that the policy engine 380 of the guest monitor component 374 may be configured to handle reassignment of network device controls in addition to contain lateral movement of the malware such as halting operability of the compromised, guest OS 300 and initiating activation of the second virtual machine 175 with the recovery OS 310. Of course, other components within the virtualization layer 185 may be configured to handle (or assist) in the shift of operability from the first virtual machine 170 with the guest OS 300 to the second virtual machine 175 with the recovery OS 310.

4. Threat Protection Component

As described above and shown in FIG. 3, detection of a suspicious and/or malicious object 335 may be performed by static and dynamic analysis of the object 335 within the first virtual machine 170. Events associated with the process are monitored and stored by the guest agent process 172. Operating in concert with the guest agent process 172, the threat protection component 376 is responsible for further malware detection on the endpoint device $140_3$ based on an analysis of events received from the guest agent process 172 running in the first virtual machine 170. It is contemplated, however, that detection of suspicious/malicious activity may also be conducted completely outside the guest environment 160, such as solely within the threat protection logic 376 of the host environment 180. The threat protection logic 376 relies on an interaction with the guest agent process 172 when it needs to receive semantic information from inside the guest OS that the host environment 180 could not otherwise obtain itself.

After analysis, the detected events are correlated and classified as benign (i.e., determination of the analyzed object 335 being malicious is less than a first level of probability); suspicious (i.e., determination of the analyzed object 335 being malicious is between the first level and a second level of probability); or malicious (i.e., determination of the analyzed object 335 being malicious is greater than the second level of probability). The correlation and classification operations may be accomplished by a behavioral analysis logic 390 and a classifier 395. The behavioral analysis logic 390 and classifier 395 may cooperate to analyze and classify certain observed behaviors of the object (based on events) as indicative of malware.

In particular, the observed run-time behaviors by the guest agent 172 are provided to the behavioral analysis logic 390 as dynamic analysis results. These events may include commands that may be construed as disrupting or disabling operability of the network adapter, which may be hooked (intercepted) for handling by the virtualization layer 185. As a result, the guest monitor component 374 receives data associated with the events from the guest agent 172 and routes the same to the threat protection component 376.

At this time, the static analysis results and dynamic analysis results may be stored in memory 220, along with any additional data from the guest agent 172. These results may be provided via coordinated IPC-based communications to the behavioral analysis logic 390, which may provide correlation information to the classifier 395. Additionally, or in the alternative, the results and/or events may be provided or attempted to be reported via a network device initiated by the guest OS kernel to the MDS 140$_2$ for correlation. The behavioral analysis logic 390 may be embodied as a rules-based correlation engine illustratively executing as an isolated process (software component) that communicates with the guest environment 160 via the guest monitor component 374.

In an embodiment, the behavioral analysis logic 390 may be configured to operate on correlation rules that define, among other things, patterns (e.g., sequences) of known malicious events (if-then statements with respect to, e.g., attempts by a process to change memory in a certain way that is known to be malicious) and/or known non-malicious events. The events may collectively correlate to malicious behavior. The rules of the behavioral analysis logic 390 may then be correlated against those dynamic analysis results, as well as static analysis results, to generate correlation information pertaining to, e.g., a level of risk or a numerical score used to arrive at a decision of maliciousness.

The classifier 395 may be configured to use the correlation information provided by behavioral analysis logic 390 to render a decision as to whether the object 335 is malicious. Illustratively, the classifier 395 may be configured to classify the correlation information, including monitored behaviors (expected and unexpected/anomalous) and access violations, of the object 335 relative to those of known malware and benign content.

Periodically or aperiodically, rules may be pushed from the MDS 140$_2$ to the endpoint device 140$_3$ to update the behavioral analysis logic 390, wherein the rules may be applied as different behaviors and monitored. For example, the correlation rules pushed to the behavioral analysis logic 390 may include, for example, rules that specify a level of probability of maliciousness, requests to close certain network ports that are ordinarily used by an application program, and/or attempts to disable certain functions performed by the network adapter. Alternatively, the correlation rules may be pulled based on a request from an endpoint device 140$_3$ to determine whether new rules are available, and in response, the new rules are downloaded.

Illustratively, the behavioral analysis logic 390 and classifier 395 may be implemented as separate modules although, in the alternative, the behavioral analysis logic 390 and classifier 395 may be implemented as a single module disposed over (i.e., running on top of) the micro-hypervisor 360. The behavioral analysis logic 390 may be configured to correlate observed behaviors (e.g., results of static and dynamic analysis) with known malware and/or benign objects (embodied as defined rules) and generate an output (e.g., a level of risk or a numerical score associated with an object) that is provided to and used by the classifier 395 to render a decision of malware based on the risk level or score exceeding a probability threshold. The reporting module 336, which executes as a user mode process in the guest OS 300, is configured to generate an alert for transmission external to the endpoint device 140$_3$ (e.g., to one or more other endpoint devices, a management appliance, or MDS 140$_2$) in accordance with "post-solution" activity.

IV. Compromised Guest OS Kernel Detection and OS Recovery

According to one embodiment of the disclosure, the virtualization layer provides enhanced detection of a compromised software component (e.g., guest OS 300) operating within a virtual machine. The guest OS 300 is considered "compromised" when, due on a malicious attack, the functionality of the guest OS kernel 301 has been altered to disrupt or completely disable external network connectivity for the endpoint device. Also, the guest OS 300 may be considered "compromised" when an attacker has managed to take control of the guest OS kernel 301 and altering functionality (e.g., disabling network connectivity, etc.).

After detection, the virtualization layer 185 is configured to halt operability of the compromised (active) guest OS 300 and reconfigure the IOMMU 250 to assign some or all of the network devices, formerly driven by the guest OS 300 of the first virtual machine 170, to now be driven by the recovery OS 310 of the second virtual machine 175. Thereafter, the second virtual machine 175 undergoes a boot process, which initializes this virtual platform and places all of the network devices into a trustworthy state. Now, the external network connectivity for the endpoint device, as driven by the recovery OS 310 of the second virtual machine 175, is in operation. The first virtual machine 170 may undergo a graceful handoff (takeover) to allow the first virtual machine 170 to complete its analysis and to save state upon such completion which may be used in forensic analysis to determine when and how the guest OS 300 was compromised.

There may be a variety of techniques for detecting the change in functionality of the guest OS 300 that constitutes an attempted disruption or a disabling of external network connectivity from the endpoint device. In response, the virtualization layer alters an operating state of the second virtual machine 175 with the recovery OS 310.

Figure 4A:
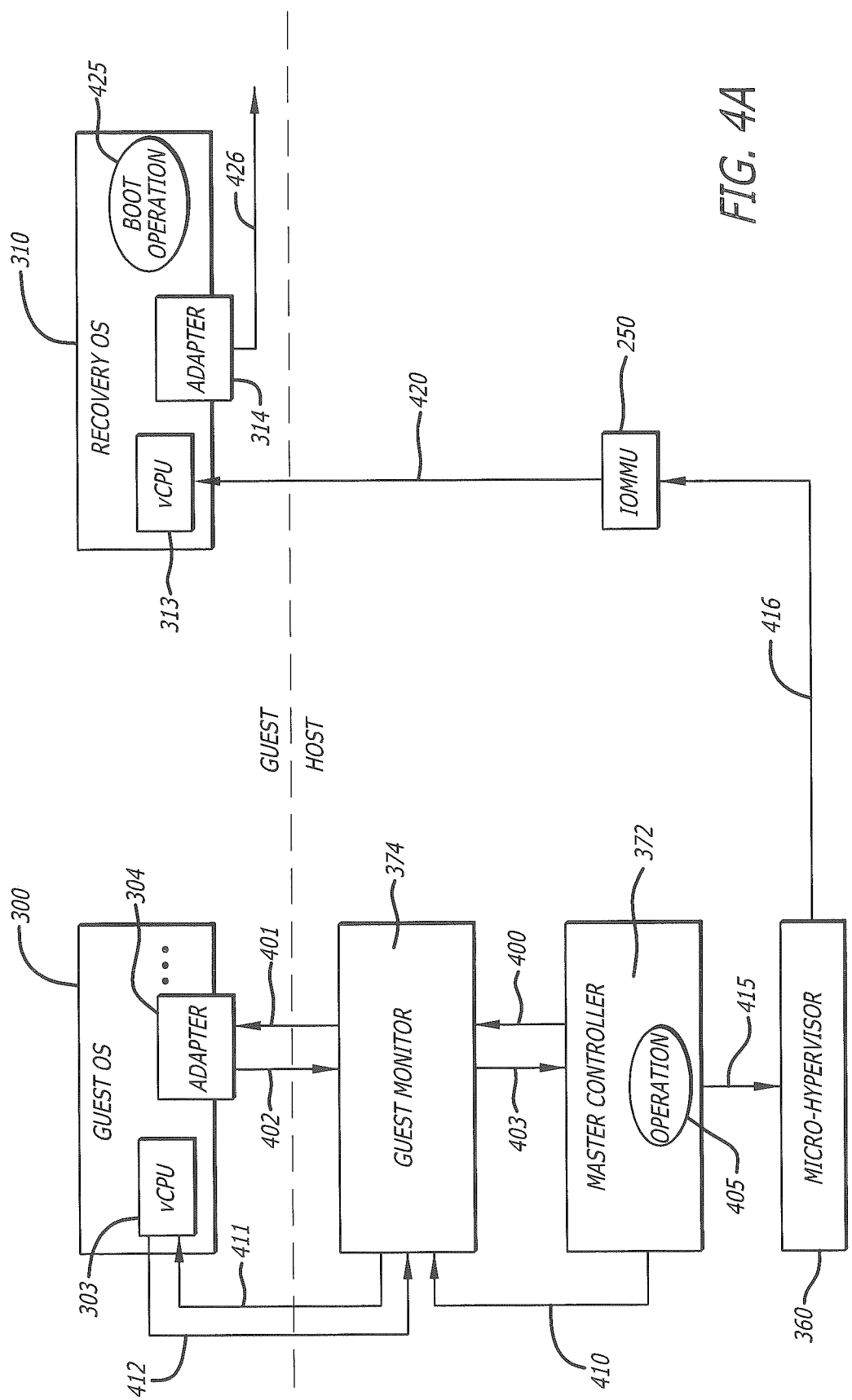
FIG. 4A is an exemplary flowchart of the operations associated a first technique for guest OS evaluation and OS recovery.

As shown in FIG. 4A, a first technique involves the OS evaluation logic of the master controller component 372 transmitting a message destined to the network adapter 304 via the guest agent (not shown) to acquire state information from the guest OS 300 (see operations 400-403). The state information 400-403 may include, but is not limited or restricted to the current operating state of the network adapter such as the presence or absence of keepalive network packets, presence or absence of network interrupts, or information from statistical registers in the network adapter, as described above. Upon receipt of the state information, the master controller component 372 determines, in accordance with the policy rules governing operability of the network adapter (network adapter 304), whether the guest OS 300 has been compromised (operation 405).

When the state information indicates that there is a high likelihood that the guest OS 300 has been compromised, the master controller component 372 may be configured to signal the guest monitor component 374 to halt operations of the first virtual machine 170 (operations 410-411). Additionally, the guest monitor component 374 may secure a copy of the actual state of the first virtual machine as a snapshot (operation 412). The master controller component 372, which is responsible for policy decisions as to device resources, may request the micro-hypervisor 360 to reconfigure the IOMMU 250 (operation 415).

Thereafter, the micro-hypervisor 360 reassigns the network devices and the device resources (e.g., device registers, memory registers, etc.) to the recovery OS 310 (operation 420). As described, the recovery OS 310 may be deployed in a different virtual machine than the guest OS 300 or may be merely substituted for the guest OS 300 and corresponding guest application(s). After such reassignment, the virtualization layer (e.g., guest monitor component 374 and/or master controller component 372 and/or micro-hypervisor 360) boots the virtual machine under control by the recovery OS 310 to subsequently establish network connectivity through one or more external communication channels with a computing device remotely located from the endpoint device $140_3$ (operations 425-426).

Figure 4B:
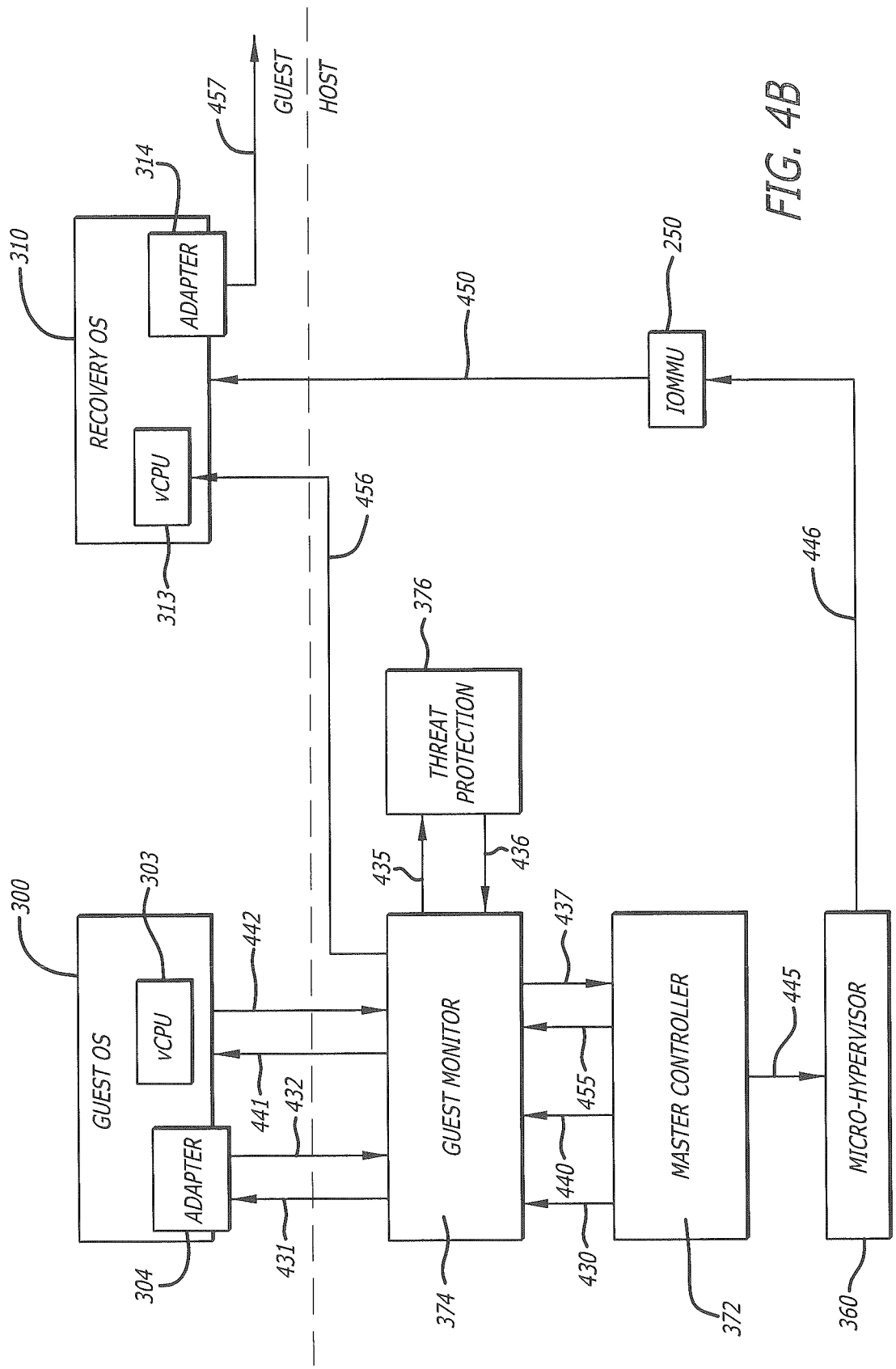
FIG. 4B is an exemplary flowchart of the operations associated a second technique for guest OS evaluation and OS recovery.

Referring now to FIG. 4B, a second technique for detecting that the first guest OS is compromised with subsequent OS recovery is shown. Herein, the master controller component 372 prompts the guest monitor component 374 to obtain state information from the network adapter 304 that drives the physical network adapter (operations 430-432). Responsive to receipt of the state information, the guest monitor component 374 transmits at least a portion of the state information to the threat protection component 376, which analyzes the state information to determine whether the state information suggests that the first guest OS is compromised (operations 435-437).

Upon receipt of the results of the analysis by the threat protection component 376, if the results identify that there is a high likelihood that the guest OS 300 has been compromised, the master controller component 372 may be configured to signal the guest monitor to halt operations of the first virtual machine and obtain a copy of the actual state of the first virtual machine as a snapshot (operations 440-442). Additionally, the master controller component 372 may request the micro-hypervisor 360 to reconfigure the IOMMU 250 (operation 445).

After receiving a request from the master controller component 372, the micro-hypervisor 360 reconfigures the IOMMU 250, which reassigns the network devices and the device resources (e.g., device registers, memory registers, etc.) to the recovery OS 310 (operation 450). After such reassignment, the virtualization layer boots the virtual machine under control by the recovery OS 310, which subsequently establishes network connectivity through one or more external communication channels with a computing device remotely located from the endpoint device $140_3$ (operations 455-457).

Figure 5:
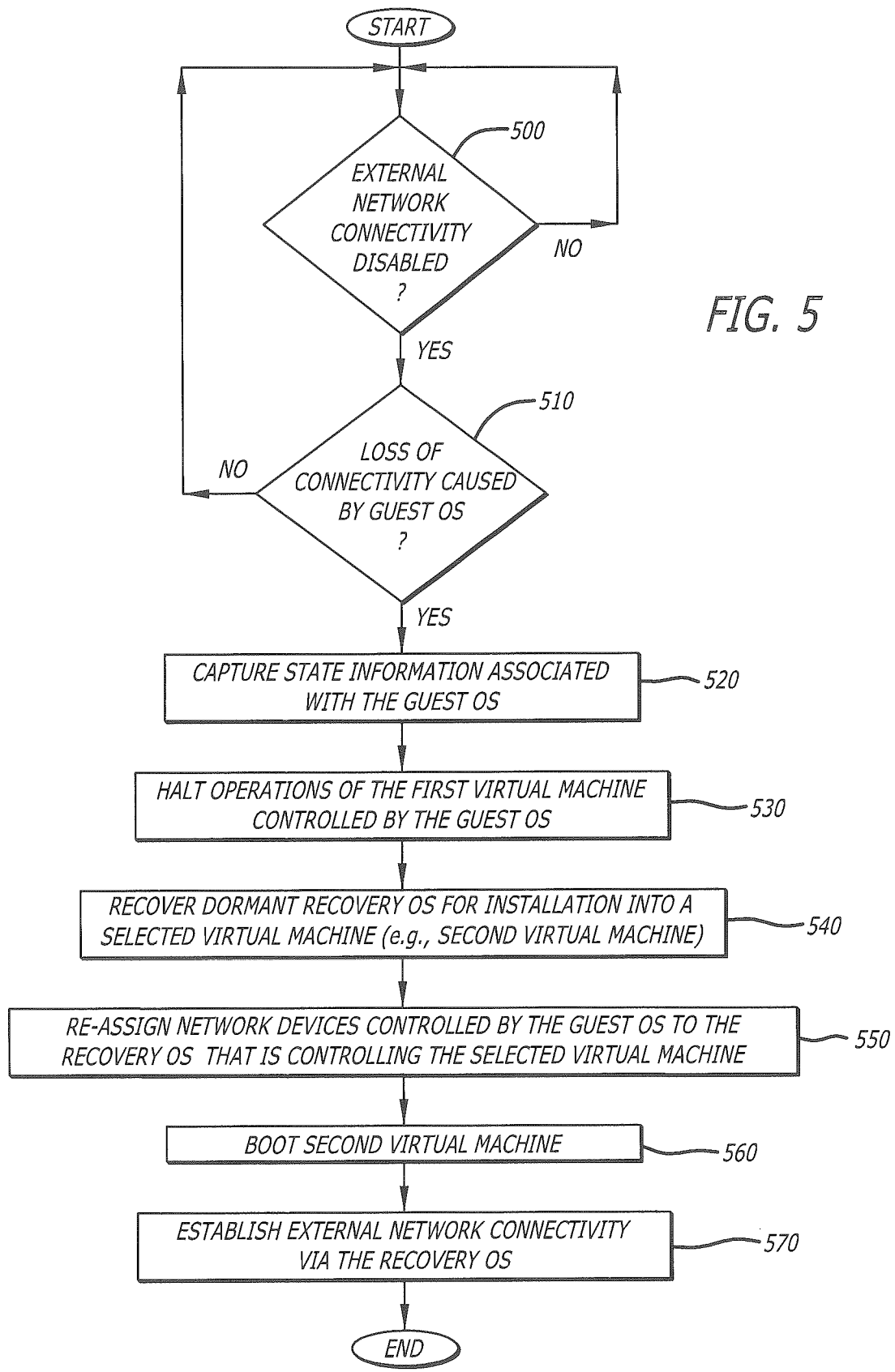
FIG. 5 is an exemplary flowchart of the operations for detecting loss of network connectivity caused by a non-functional guest OS and conducting an OS recovery response to re-establish network connectivity.

Referring to FIG. 5, an exemplary embodiment of operations for detecting loss of network connectivity caused by a compromised guest OS and conducting an OS recovery response to re-establish network connectivity is shown. Herein, a first determination is made by the virtualization layer whether external network connectivity for the computing device has been disabled (item 500). This determination may be accomplished by monitoring a state of the network adapter through periodic (heartbeat) messages or accessing certain statistical registers associated with the network adapter for example.

If external network connectivity for a computing device has been disabled, a second determination may be conducted as to the reasons as to why the external network connectivity has been disabled (item 510). This determination may involve an analysis of one or more events, as captured by the guest agent process, that lead up to loss of external network connectivity in order to confirm that the external network connectivity was disabled due to operations conducted by the guest OS. Otherwise, if loss of the external network connectivity is due to a hardware failure or activities that are unrelated to the guest OS, the analysis discontinues.

Upon determining that external network connectivity has been disabled due to operations conducted by the guest OS (perhaps after attempts to re-enable the external network connectivity), the virtualization layer concludes that the guest OS is compromised. Hence, state information (data associated with the operating state of the guest OS) may be captured and the operations of the first virtual machine (with the guest OS) are halted (items 520 and 530).

Thereafter, a dormant recovery OS that is resident in non-transitory storage medium as an OS image may be fetched and installed into a selected virtual machine (item 540). The selected virtual machine may be the first virtual machine (where the recovery OS is substituted for the guest OS) or may be a second virtual machine different from the first virtual machine. Thereafter, the network device resources (and network devices that are currently driven by the guest OS kernel of the first virtual machine) are re-assigned to the recovery OS (item 550). Thereafter, the (second) virtual machine is booted, which causes the recovery OS to run and configure its network adapter to establish external network connectivity so that the endpoint device may electronically communicate with other computing devices located remotely from the endpoint device (items 560 and 570). This allows for the transmission of reports and/or alert messages over a network, which may identify one or more malicious event that is detected during virtual processing of an object under test.

In the foregoing description, the invention is described with reference to specific exemplary embodiments thereof. For instance, the guest OS and the recovery OS may be deployed on the same virtual machine, where the recovery OS remains dormant as a standby OS unless the guest OS is compromised. It will, however, be evident that various modifications and changes may be made thereto without departing from the broader spirit and scope of the invention as set forth in the appended claims.

What is claimed is:

1. A computing device comprising:
   one or more hardware processors; and
   a memory coupled to the one or more hardware processors, the memory comprises one or more software components that, when executed by the one or more hardware processors, operate as (i) a visualization layer deployed in a host environment of a virtualization software architecture and (ii) a plurality of virtual machines deployed within a guest environment of the virtualization software architecture, the plurality of virtual machines comprises (a) a first virtual machine that is operating under control of a first operating system and including an agent collecting runtime state information of a network adapter and (b) a second virtual machine that is separate from the first virtual machine and is operating under control of a second operating system in response to determining that the first operating system has been compromised, the second virtual machine being configured to drive the network adapter, wherein after receipt of the state information by the virtualization layer, transmitting at least a portion of the state information to a threat protection component being deployed within the virtualization layer, analyzing, by the threat protection component, the state information to determine whether the first operating system is compromised by at least determining whether (i) an external network connection through the network adapter has been disabled or (ii) a kernel of the first operating system is attempting to disable the external network connection through the network adapter, and upon receipt of the results of the analyzing by the threat protection component that the first operating system is compromised, signaling, by the virtualization layer, to halt operations of the first virtual machine, installing, by the virtualization layer, a second operating system image retained within the memory of the computing device into the second virtual machine, reassigning, by the virtualization layer, the network adapter and adapter resources to the second operating system, the second virtual machine configured to drive the network adapter, and booting the second virtual machine subsequent to the reassignment of the network adapter and the adapter resources from the first operating system to the second operating system.

2. The computing device of claim 1, wherein the network adapter is configured to establish an external network connection to another computing device.

3. The computing device of claim 1, wherein the memory comprises software, including the one or more software components that, when executed by the one or more hardware processors, operates as the virtualization software architecture that comprises the guest environment including the first virtual machine and the host environment including the virtualization layer that analyzes data provided from the first virtual machine to determine whether the first operating system has been compromised.

4. The computing device of claim 3, wherein the virtualization layer in the host environment comprises (1) a guest monitor component that determines whether an event, received from a process running on the first virtual machine that is configured to monitor operability of the network adapter, is directed to disabling or disrupting functionality of the network adapter and (2) a threat protection component that determines that the first operating system is compromised if the event is classified as malicious.

5. The computing device of claim 4, wherein an event of the one or more events is classified as malicious upon determining that the event represents that an external network connection via the network adapter has been disabled.

6. The computing device of claim 4, wherein the event is classified as malicious upon determining that a kernel of the first operating system is attempting to disable the external network connection via the network adapter.

7. The computing device of claim 3, wherein the virtualization layer in the host environment comprises a threat protection component that determines that the first operating system is compromised when the one or more events is classified as malicious upon determining that the first operating system is non-functional.

8. The computing device of claim 3, wherein the virtualization layer in the host environment comprises a threat protection component that determines that the first operating system (OS) is compromised when the one or more events is classified as malicious upon determining that a guest OS application of the first operating system is inoperable.

9. The computing device of claim 1, wherein the second virtual machine is configured by removal of a first operating system (OS) kernel and one or more guest OS applications of the first operating system and installation of a second OS kernel and one or more guest OS applications of the second operating system.

10. The computing device of claim 1, wherein the first virtual machine transitioning from an active state to an inactive state when the first operating system is determined to be compromised.

11. The computing device of claim 1, wherein the first operating system is a different type of operating system than the second operating system.

12. The computing device of claim 1, wherein the network adapter corresponds to a software-emulated data transfer device.

13. A non-transitory storage medium that includes software that is executable by one or more processors and, upon execution, operates a virtualization software architecture, the non-transitory storage medium comprising:

one or more software components that, when executed by the one or more processors, operate as a network adapter;

one or more software components that, when executed by the one or more processors, operate as a virtualization layer;

one or more software components that, when executed by the one or more processors, operate as a first virtual machine being part of the virtualization software architecture, the first virtual machine operating under control of a first operating system and including an agent collecting runtime state information of a network adapter; and one or more software components that, when executed by the one or more processors, operate as a second virtual machine being part of the virtualization software architecture, the second virtual machine operating under control of a second operating system in response to determining that the first operating system has been compromised in which functionality of the first operating system is determined to have been altered or network connectivity by the first virtual machine has been disabled, wherein after receipt of the state information by the virtualization layer, transmitting at least a portion of the state information to a threat protection component being deployed within the virtualization layer, analyzing, by the threat protection component, the state information to determine whether the first operating system is compromised by at least determining whether (i) an external network connection through the network adapter has been disabled or (ii) a kernel of the first operating system is attempting to disable the external network connection through the network adapter, and upon receipt of the results of the analyzing by the threat protection component that the first operating system is compromised, signaling, by the virtualization layer, to halt operations of the first virtual machine, installing, by the virtualization layer, a second operating system image retained within the memory of the computing device into the second virtual machine, reassigning, by the virtualization layer, the network adapter and adapter resources to the second operating system, the second virtual machine configured to drive the network adapter, and booting the second virtual machine subsequent to the reassignment of the network adapter and the adapter resources from the first operating system to the second operating system.

14. The non-transitory storage medium of claim 13, wherein the virtualization layer analyzes data provided from the first virtual machine to determine whether the first operating system has been compromised.

15. The non-transitory storage medium of claim 14, wherein the virtualization layer determines that the first operating system has been compromised based on a state of functionality of the network adapter in communications with the first operating system of the first virtual machine.

16. The non-transitory storage medium of claim 14, wherein the virtualization layer comprises (1) a guest monitor component that determines whether one or more events, which are received from a process running on the first virtual machine that is configured to monitor operability of a network adapter in communications with the first operating system of the first virtual machine, is malicious as being directed to disabling or disrupting functionality of the network adapter and (2) the threat protection component that determines that the first operating system is compromised if the one or more events are classified as malicious.

17. The non-transitory storage medium of claim 16, wherein the threat protection component classifies the one or more events as malicious upon determining that the one or more events represent that external network connection via the network adapter has been disabled.

18. The non-transitory storage medium of claim 16, wherein the threat protection component classifies the one or more events as malicious upon determining that either (i) the first operating system is non-functional or (ii) an operability of a guest OS application of the first operating system has ceased.

19. The non-transitory storage medium of claim 16, wherein the threat protection component classifies the one or more events as malicious upon determining that a kernel of the first operating system is attempting to disable the external network connection via the network adapter.

20. The non-transitory storage medium of claim 13, wherein the second virtual machine is configured by removal of a first operating system (OS) kernel and one or more guest OS applications of the first operating system and installation of a second OS kernel and one or more guest OS applications of the second operating system.

21. The non-transitory storage medium of claim 13, wherein the first virtual machine is independent from the second virtual machine.

22. The non-transitory storage medium of claim 13, wherein the second virtual machine is a reconfiguration of the first virtual machine.

23. A computerized method for protecting connectivity of a computing device to an external network in response to a virtualization layer of the computing device detecting that a guest operating system of the computing device has been compromised by a potential malicious attack through malware, the method comprising:

operating a first virtual machine under control of a first operating system, the first virtual machine in communication with a network adapter and an agent collecting runtime state information of a network adapter;

responsive to receipt of the state information by the virtualization layer, transmitting at least a portion of the state information to a threat protection component being deployed within the virtualization layer operating within a host environment of the computing device;

analyzing, by the threat protection component, the state information to determine whether the first operating system is compromised by at least determining whether (i) an external network connection through the network adapter has been disabled or (ii) a kernel of the first operating system is attempting to disable the external network connection through the network adapter; and upon receipt of the results of the analyzing by the threat protection component that the first operating system is compromised, signaling, by the virtualization layer, to halt operations of the first virtual machine, installing, by the virtualization layer, a second operating system image retained within memory of the computing device into a second virtual machine, the second virtual machine being separate from the first virtual machine and allocated to a different address space than allocated to the first virtual machine, reassigning, by the virtualization layer, the network adapter and adapter resources to the second operating system, the second virtual machine configured to drive the reassigned network adapter, and booting the second virtual machine subsequent to the reassignment of the network adapter and the adapter resources from the first operating system to the second operating system.

24. The computerized method of claim 23 further comprising:

conducting a boot process on the second virtual machine so that external network connectivity, as driven by the second operating system of the second virtual machine, is in operation.

25. The computerized method of claim 23, wherein the virtualization layer determines that the first operating system has been compromised based on a state of functionality of the network adapter in communications with the first operating system of the first virtual machine.

26. The computerized method of claim 23, wherein the virtualization layer comprises (1) a guest monitor component that determines whether one or more events corresponding to the state information being received from the agent configured to monitor operability of the network adapter, are being directed to disabling or disrupting functionality of the network adapter and (2) the threat protection component that determines that the first operating system is compromised if the one or more events are classified as malicious.

27. The computerized method of claim 26, wherein the threat protection component classifies the one or more events as malicious upon determining that the one or more events represent that external network connection via the network adapter has been disabled.

28. The computerized method of claim 27, wherein the threat protection component classifies the one or more events as malicious upon determining that either (i) the first operating system is non-functional or (ii) an operability of a guest operating system (OS) application of the first operating system has ceased.

29. The computerized method of claim 26, wherein the threat protection component classifies the one or more events as malicious upon determining that the kernel of the first operating system is attempting to disable the external network connection via the network adapter.

30. The computerized method of claim 23, wherein the second virtual machine is configured by removal of at least the kernel of the first operating system and installation of a kernel of the second operating system.

\* \* \* \* \*